(12) United States Patent
Saito et al.

(10) Patent No.: US 10,838,147 B2
(45) Date of Patent: Nov. 17, 2020

(54) OPTICAL ELEMENT HAVING A LOWER CORE HEIGHT PORTION AND MANUFACTURING METHOD THEREOF AND OPTICAL MODULATOR

(71) Applicant: FURUKAWA ELECTRIC CO., LTD., Tokyo (JP)

(72) Inventors: Yusuke Saito, Tokyo (JP); Tatsuya Kimoto, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/050,025

(22) Filed: Jul. 31, 2018

(65) Prior Publication Data

US 2018/0335569 A1    Nov. 22, 2018

Related U.S. Application Data

(63) Continuation of application No. PCT/JP2017/004058, filed on Feb. 3, 2017.

(30) Foreign Application Priority Data

Feb. 4, 2016 (JP) ................................. 2016-019876

(51) Int. Cl.
*G02B 6/122* (2006.01)
*G02B 6/136* (2006.01)
(Continued)

(52) U.S. Cl.
CPC ........... *G02B 6/1228* (2013.01); *G02B 6/136* (2013.01); *G02B 6/14* (2013.01); *G02F 1/025* (2013.01);
(Continued)

(58) Field of Classification Search
CPC .................. G02B 6/1228; G02B 6/136; G02B 2006/12173; G02B 2006/12078; G02F 1/2257; G02F 2001/212
See application file for complete search history.

(56) References Cited

U.S. PATENT DOCUMENTS 6,571,037 B1    5/2003 Rogers et al.
6,768,855 B1 *  7/2004 Bakke ................. G02B 6/1228
                                            385/129
(Continued)

FOREIGN PATENT DOCUMENTS

CN    101133355 A    2/2008
JP    05-188407      7/1993
(Continued)

OTHER PUBLICATIONS

International Search Report dated Apr. 25, 2017 in PCT/JP2017/004058 filed Feb. 3, 2017 (with English Translation).
(Continued)

*Primary Examiner* — Andrew Jordan
(74) *Attorney, Agent, or Firm* — Oblon, McClelland, Maier & Neustadt, L.L.P.

(57) ABSTRACT

An optical element has a substrate; and first to third optical waveguides formed on the substrate and each having a lower clad layer, a core layer, and an upper clad layer, the core layer having a larger refractive index than the lower clad layer and the upper clad layer. The first optical waveguide is optically connected to the second optical waveguide, and the second optical waveguide is optically connected to the third optical waveguide. The first to third optical waveguides have a mesa structure formed in a mesa shape in which at least the upper clad layer and an upper part of the core layer project above the lower clad layer. The core height of the third optical waveguide is lower than the core height of the first (Continued)

optical waveguide. The mesa width of the third optical waveguide is narrower than the mesa width of the first optical waveguide.

10 Claims, 17 Drawing Sheets

(51) Int. Cl.
    *G02F 1/025*     (2006.01)
    *G02B 6/14*     (2006.01)
    *G02F 1/225*     (2006.01)
    *G02B 6/12*     (2006.01)
    *G02F 1/21*     (2006.01)

(52) U.S. Cl.
    CPC .. *G02F 1/2257* (2013.01); *G02B 2006/12078* (2013.01); *G02B 2006/12173* (2013.01); *G02F 2001/212* (2013.01)

(56) References Cited

U.S. PATENT DOCUMENTS

| | | | | |
|---|---|---|---|---|
| 7,228,015 | B2 * | 6/2007 | Watts | G02B 6/126 385/11 |
| 7,711,214 | B2 * | 5/2010 | Tsuzuki | G02F 1/025 359/248 |
| 7,796,846 | B2 * | 9/2010 | Kiyota | G02B 6/122 385/129 |
| 8,094,978 | B2 * | 1/2012 | Tokushima | G02B 6/1228 385/11 |
| 8,126,301 | B2 * | 2/2012 | Ishizaka | G02B 6/1228 216/51 |
| 8,380,032 | B2 * | 2/2013 | Hasegawa | B82Y 20/00 359/27 |
| 9,261,649 | B2 * | 2/2016 | Kitamura | G02B 6/136 |
| 9,529,151 | B2 * | 12/2016 | Goi | G02B 6/126 |
| 9,977,188 | B2 * | 5/2018 | Lambert | G02B 6/14 |
| 2005/0254128 | A1 * | 11/2005 | Watts | G02B 6/126 359/558 |
| 2006/0018584 | A1 * | 1/2006 | Watts | G02B 6/126 385/11 |
| 2009/0034904 | A1 * | 2/2009 | Tsuzuki | G02F 1/025 385/14 |
| 2009/0185774 | A1 * | 7/2009 | Kiyota | G02B 6/122 385/14 |
| 2010/0002989 | A1 * | 1/2010 | Tokushima | G02B 6/1228 385/14 |
| 2010/0086255 | A1 * | 4/2010 | Ishizaka | G02B 6/1228 385/31 |
| 2010/0158443 | A1 | 6/2010 | Jeong | |
| 2011/0064360 | A1 | 3/2011 | Jeong | |
| 2011/0243494 | A1 * | 10/2011 | Hasegawa | B82Y 20/00 385/14 |
| 2012/0057815 | A1 * | 3/2012 | Ezaki | G02F 1/025 385/3 |
| 2016/0178842 | A1 * | 6/2016 | Goi | G02B 6/126 385/11 |
| 2018/0335569 | A1 * | 11/2018 | Saito | G02F 1/025 |

FOREIGN PATENT DOCUMENTS

| | | |
|---|---|---|
| JP | 11-052149 | 2/1999 |
| JP | 2003-207665 | 7/2003 |
| JP | 2005-215395 | 8/2005 |
| JP | 2010-151973 | 7/2010 |
| JP | 2011-064793 | 3/2011 |

OTHER PUBLICATIONS

Written Opinion dated Apr. 25, 2017 in PCT/JP2017/004058 filed Feb. 3, 2017.
Combined Chinese Office Action and Search Report dated Nov. 1, 2019 in corresponding Chinese Patent Application No. 201780019420.6 (with English Translation and English Translation of Category of Cited Documents), 21 pages.

* cited by examiner

FIG. 6A

FUNDAMENTAL MODE LOSS (dB)

| MESA WIDTH $W_3$ (μm) | UNDER-CORE DEPTH $(d_3-d_c)$ (μm) | | | |
|---|---|---|---|---|
| | 0 | 0.1 | 0.25 | 0.5 |
| 0.6 | 22.6 | 17.2 | 6.5 | 1.1 |
| 0.7 | 3.2 | 3.9 | 2.0 | 0.3 |
| 0.9 | 0.1 | 0.0 | 0.0 | 0.0 |
| 1.0 | 0.0 | 0.0 | 0.0 | 0.0 |
| 1.1 | 0.0 | 0.0 | 0.0 | 0.0 |
| 1.2 | 0.0 | 0.0 | 0.0 | 0.0 |
| 1.3 | 0.0 | 0.0 | 0.0 | 0.0 |
| 1.5 | 0.0 | 0.0 | 0.0 | 0.0 |
| 2.0 | 0.0 | 0.0 | 0.0 | 0.0 |

FIG. 6B

FIRST ORDER MODE LOSS (dB)

| MESA WIDTH $W_3$ (μm) | UNDER-CORE DEPTH $(d_3-d_c)$ (μm) | | | |
|---|---|---|---|---|
| | 0 | 0.1 | 0.25 | 0.5 |
| 0.6 | 55.1 | 64.0 | 25.2 | 5.1 |
| 0.7 | 56.2 | 57.1 | 21.7 | 3.7 |
| 0.9 | 43.4 | 46.3 | 11.1 | 2.0 |
| 1.0 | 40.9 | 23.3 | 8.0 | 1.4 |
| 1.1 | 31.8 | 15.3 | 5.5 | 0.9 |
| 1.2 | 14.9 | 9.2 | 3.3 | 0.6 |
| 1.3 | 7.2 | 4.8 | 1.8 | 0.3 |
| 1.5 | 0.6 | 0.4 | 0.2 | 0.0 |
| 2.0 | 0.0 | 0.0 | 0.0 | 0.0 |

FIG. 7A

FUNDAMENTAL MODE LOSS (dB)

| | | UNDER-CORE DEPTH ($d_3-d_c$) (μm) | | |
|---|---|---|---|---|
| | | 0.1 | 0.25 | 0.5 |
| MESA WIDTH $W_3$ (μm) | 0.6 | | | 12.5 |
| | 0.8 | | | 9.4 |
| | 1 | | | 5.0 |
| | 1.2 | | 3.4 | 1.8 |
| | 1.5 | 0.3 | 0.2 | 0.1 |
| | 2 | 0.1 | 0.0 | 0.0 |
| | 2.5 | 0.0 | 0.0 | 0.0 |

FIG. 7B

FIRST ORDER MODE LOSS (dB)

| | | UNDER-CORE DEPTH ($d_3-d_c$) (μm) | | |
|---|---|---|---|---|
| | | 0.1 | 0.25 | 0.5 |
| MESA WIDTH $W_3$ (μm) | 0.6 | | | 15.3 |
| | 0.8 | | | 13.8 |
| | 1 | | | 12.1 |
| | 1.2 | | 32.0 | 10.1 |
| | 1.5 | 29.7 | 19.3 | 7.0 |
| | 2 | 9.5 | 6.5 | 2.7 |
| | 2.5 | 1.6 | 1.1 | 0.5 |

FIG. 8A

FUNDAMENTAL MODE LOSS (dB)

| MESA WIDTH $W_3$ (μm) | UNDER-CORE DEPTH ($d_3-d_c$) (μm) | | |
| --- | --- | --- | --- |
| | 0.1 | 0.25 | 0.5 |
| 0.6 | | | 3.0 |
| 0.8 | | 2.8 | 0.8 |
| 1 | 0.2 | 0.1 | 0.0 |
| 1.2 | 0.0 | 0.0 | 0.0 |
| 1.4 | 0.1 | 0.1 | 0.1 |
| 1.6 | 0.0 | 0.0 | 0.0 |
| 1.8 | 0.0 | 0.0 | 0.0 |
| 2 | 0.0 | 0.0 | 0.0 |
| 2.5 | 0.0 | 0.0 | 0.0 |

FIG. 8B

FIRST ORDER MODE LOSS (dB)

| MESA WIDTH $W_3$ (μm) | UNDER-CORE DEPTH ($d_3-d_c$) (μm) | | |
| --- | --- | --- | --- |
| | 0.1 | 0.25 | 0.5 |
| 0.6 | | | 8.1 |
| 0.8 | | 27.3 | 5.2 |
| 1 | 41.0 | 16.1 | 3.3 |
| 1.2 | 20.6 | 8.6 | 2.0 |
| 1.4 | 8.2 | 3.9 | 0.9 |
| 1.6 | 2.2 | 1.2 | 0.3 |
| 1.8 | 0.2 | 0.1 | 0.0 |
| 2 | 0.1 | 0.0 | 0.0 |
| 2.5 | 0.0 | 0.0 | 0.0 |

OPTICAL ELEMENT HAVING A LOWER CORE HEIGHT PORTION AND MANUFACTURING METHOD THEREOF AND OPTICAL MODULATOR

CROSS-REFERENCE TO RELATED APPLICATIONS

This application is a continuation application of International Application No. PCT/JP2017/004058, filed Feb. 3, 2017, which claims the benefit of Japanese Patent Application No. 2016-019876, filed Feb. 4, 2016. The contents of the aforementioned applications are incorporated herein by reference in their entireties.

TECHNICAL FIELD

The present invention relates to an optical element having an optical waveguide and a manufacturing method thereof.

BACKGROUND ART

As one of optical waveguides, a semiconductor optical waveguide having a core layer and a clad layer made of a semiconductor material formed on a semiconductor substrate is known. As waveguide structure of a semiconductor optical waveguide in an optical functional element or the like, the structure called high-mesa structure may be employed, for example. A high-mesa structured optical waveguide is featured in a small waveguide loss and ability of reducing a bending radius.

A high-mesa structured optical waveguide has a significantly narrow cutoff mesa width, which makes it difficult to suppress a higher order horizontal mode. Thus, a high-mesa structured optical waveguide is typically designed to have a large higher-order mode loss. Specifically, an equivalent refractive index in a higher order mode is designed to be smaller than a refractive index of a substrate. Thereby, as a result of the higher order mode emitted to the substrate side, the higher-order mode loss increases.

On the other hand, in a high-mesa structured optical waveguide, an excessively narrow mesa width for increasing a higher-order mode loss causes a larger fundamental mode loss.

Since it is thus difficult to suppress a higher order mode in a high-mesa structured optical waveguide, an optical waveguide or element that functions as a higher order mode filter for suppressing a higher order mode has been proposed so far (Patent Literatures 1 to 3).

CITATION LIST

Patent Literature

Patent Literature 1: Japanese Patent Application Publication No. 2003-207665
Patent Literature 2: Japanese Patent Application Publication No. 2011-64793
Patent Literature 3: Japanese Patent Application Publication No. H11-52149

SUMMARY OF INVENTION

Technical Problem

In the conventional optical waveguide or element as disclosed in Patent Literatures 1 to 3, however, a difference between a fundamental mode loss and a higher-order mode loss cannot be sufficiently ensured, and it is difficult to sufficiently reduce or remove the higher order mode.

The present invention has been made in view of the above and intends to provide an optical element and a manufacturing method thereof and an optical modulator that can sufficiently reduce or remove a higher order mode while suppressing the fundamental mode loss to a low level and further can be easily manufactured at low cost.

Solution to the Problem

According to an aspect of the present invention, provided is an optical element including: a substrate; and a first optical waveguide, a second optical waveguide, and a third optical waveguide formed on the substrate and each having a lower clad layer, a core layer, and an upper clad layer, wherein the core layer has a larger refractive index than the lower clad layer and the upper clad layer, wherein the first optical waveguide is optically connected to the second optical waveguide, and the second optical waveguide is optically connected to the third optical waveguide, wherein the first to third optical waveguides have a mesa structure formed in a mesa shape in which at least the upper clad layer and an upper part of the core layer project above the lower clad layer, wherein, when a core height is defined as a height, to a top face of the core layer, from a bottom face on both sides of the mesa structure or a position where a slope of a side face of the mesa structure is discontinuous toward the bottom face, the core height of the third optical waveguide is lower than the core height of the first optical waveguide, and wherein, when a mesa width is defined as a width of the center of the core layer, the mesa width of the third optical waveguide is narrower than the mesa width of the first optical waveguide.

According to another aspect of the present invention, provided is a manufacturing method of an optical element including a first optical waveguide, a second optical waveguide, and a third optical waveguide having a lower clad layer, a core layer, and an upper clad layer in which the core layer has a larger refractive index than the lower clad layer and the upper clad layer, wherein the first optical waveguide is optically connected to the second optical waveguide, and the second optical waveguide is optically connected to the third optical waveguide. The manufacturing method includes steps of: stacking the lower clad layer, the core layer, and the upper clad layer on a substrate; forming a hard mask on the upper clad layer; and dry-etching at least the upper clad layer and an upper part of the core layer by using the hard mask as a mask, wherein the hard mask has a first mask part and second mask parts, wherein the first mask part has a waveguide pattern of the first optical waveguide, a waveguide pattern of the second optical waveguide, and a waveguide pattern of the third optical waveguide, and a width of the waveguide pattern of the third optical waveguide is narrower than a width of the waveguide pattern of the first optical waveguide, and wherein the second mask parts are selectively formed in regions on both sides of the waveguide pattern of the third optical waveguide out of regions on both sides of the waveguide patterns of the first to third optical waveguides of the first mask part.

According to yet another aspect of the present invention, provided is an optical modulator including: an optical waveguide; a modulation unit that is formed in a part of the optical waveguide and modulates a phase of a light guided in the optical waveguide; and the optical element described above formed to the optical waveguide.

Advantageous Effects of Invention

According to the present invention, it is possible to sufficiently reduce or remove a higher order mode while suppressing the fundamental mode loss to a low level. Further, according to the present invention, an optical element that can sufficiently reduce or remove a higher order mode while suppressing the fundamental mode loss to a low level can be easily manufactured at low cost.

BRIEF DESCRIPTION OF DRAWINGS

FIG. 6A is a diagram (part 1) illustrating an example of a calculation result of a fundamental mode loss and a higher-order mode loss calculated for the optical element according to the first embodiment of the present invention.

FIG. 6B is a diagram (part 2) illustrating an example of a calculation result of a fundamental mode loss and a higher-order mode loss calculated for the optical element according to the first embodiment of the present invention.

FIG. 7A is a diagram (part 1) illustrating another example of a calculation result of a fundamental mode loss and a higher-order mode loss calculated for the optical element according to the first embodiment of the present invention.

FIG. 7B is a diagram (part 2) illustrating another example of a calculation result of a fundamental mode loss and a higher-order mode loss calculated for the optical element according to the first embodiment of the present invention.

FIG. 8A is a diagram (part 1) illustrating yet another example of a calculation result of a fundamental mode loss and a higher-order mode loss calculated for the optical element according to the first embodiment of the present invention.

FIG. 8B is a diagram (part 2) illustrating yet another example of a calculation result of a fundamental mode loss and a higher-order mode loss calculated for the optical element according to the first embodiment of the present invention.

DESCRIPTION OF EMBODIMENTS

First Embodiment

An optical element and a manufacturing method thereof according to a first embodiment of the present invention will be described by using FIG. 1 to FIG. 13.

Figure 1:
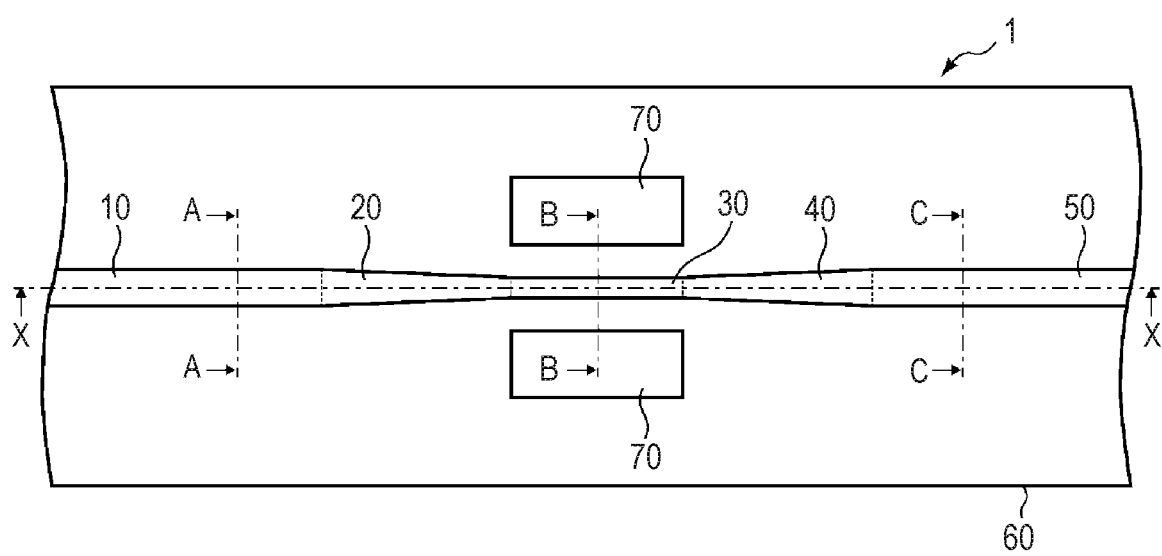
FIG. 1 is plan view illustrating an optical element according to a first embodiment of the present invention.
Figure 2:
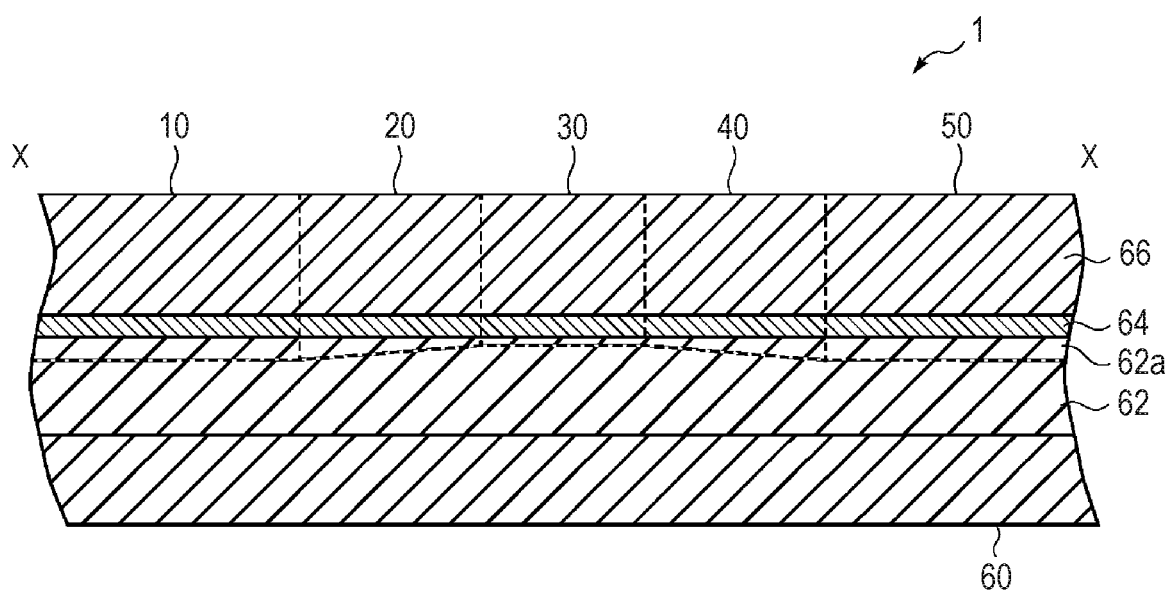
FIG. 2 is a sectional view (part 1) illustrating the optical element according to the first embodiment of the present invention.
Figure 3A:
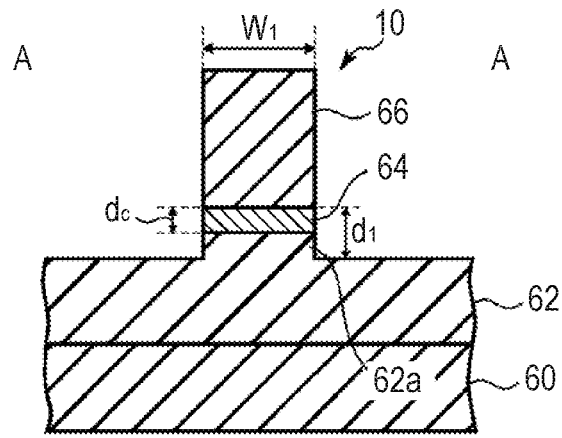
FIG. 3A is a sectional view (part 2-1) illustrating the optical element according to the first embodiment of the present invention.
Figure 3B:
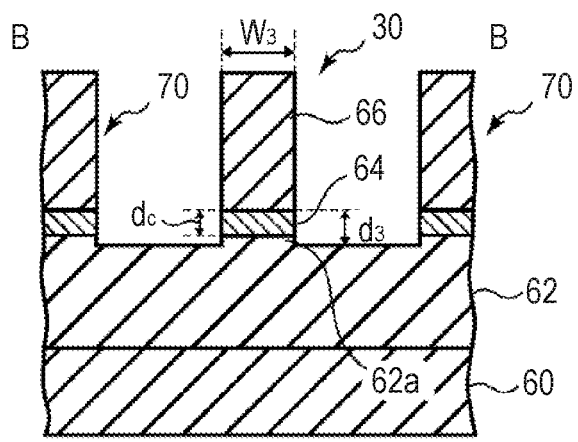
FIG. 3B is a sectional view (part 2-2) illustrating the optical element according to the first embodiment of the present invention.
Figure 3C:
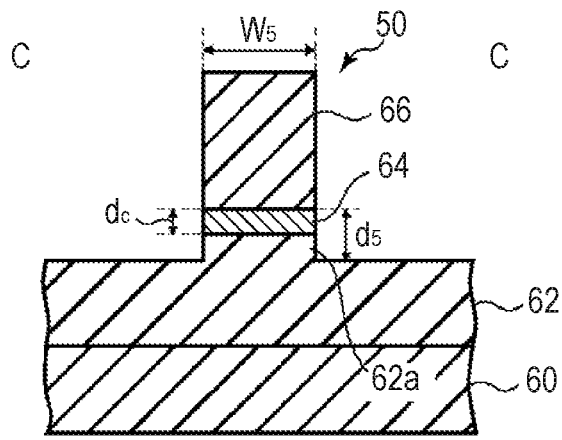
FIG. 3C is a sectional view (part 2-3) illustrating the optical element according to the first embodiment of the present invention.
Figure 4A:
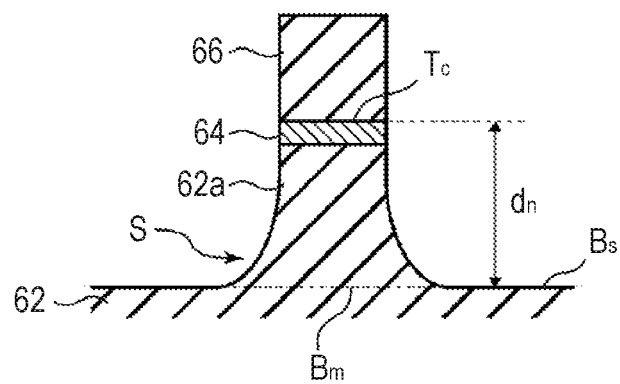
FIG. 4A is a sectional view (part 1) illustrating another example of a sectional shape that may be included in the high-mesa structure of an optical waveguide.
Figure 4B:
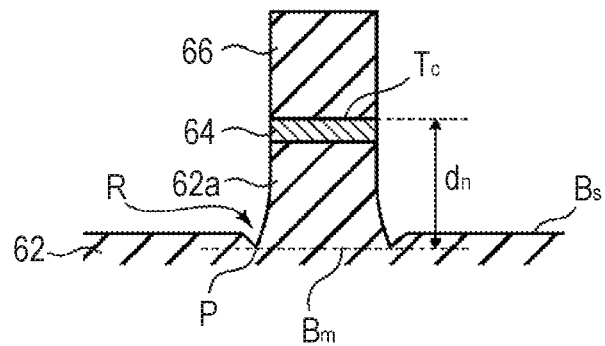
FIG. 4B is a sectional view (part 2) illustrating another example of a sectional shape that may be included in the high-mesa structure of an optical waveguide.

First, a configuration of the optical element according to the present embodiment will be described by using FIG. 1 to FIG. 4B. FIG. 1 is a plan view illustrating an optical element according to the present embodiment. FIG. 2 is a sectional view taken along the line X-X of FIG. 1. FIG. 3A is a sectional view taken along the line A-A of FIG. 1. FIG. 3B is a sectional view taken along the line B-B of FIG. 1. FIG. 3C is a sectional view taken along the line C-C of FIG. 1. FIG. 4A and FIG. 4B are sectional views illustrating another example of a sectional shape that may be included in the high-mesa structure of an optical waveguide.

The optical element according to the present embodiment functions as a higher order mode filter. The optical element according to the present embodiment can be integrated on a semiconductor substrate together with an active element such as an optical modulator as well as other elements to form an optical integration element, for example, as described in third and fourth embodiments described later.

As illustrated in FIG. 1 to FIG. 3C, an optical element 1 according to the present embodiment has a first optical waveguide 10, a second optical waveguide 20, a third optical waveguide 30, a fourth optical waveguide 40, and a fifth optical waveguide 50. Each of the first to fifth optical waveguides 10, 20, 30, 40, and 50 is a linear optical waveguide. These first to fifth optical waveguides 10, 20, 30, 40, and 50 are formed on a substrate 60 that is a semiconductor substrate. The substrate 60 is an InP substrate, for example.

On the substrate 60 on which the first to fifth optical waveguides 10, 20, 30, 40, and 50 are formed, a lower clad layer 62, a core layer 64 whose refractive index is larger than that of a lower clad layer 62, and an upper clad layer 66 whose refractive index is smaller than the core layer 64 are formed.

The lower clad layer 62 is formed of a semiconductor layer, and the upper part thereof is processed in a mesa shape to have a convex part 62a. A semiconductor layer forming the lower clad layer 62 is an InP layer, for example. Note that the lower clad layer 62 is not limited to a semiconductor layer formed on the substrate 60. The lower clad layer 62 may be formed by the upper part of the substrate 60 being processed in a mesa shape to form the core layer 64, for example. In this case, the substrate 60 forming the lower clad layer 62 is an InP substrate, for example.

The semiconductor layer formed on the lower clad layer 62 is processed in a mesa shape to form the core layer 64. The core layer 64 has a higher refractive index than the lower clad layer 62 and the upper clad layer 66. The semiconductor layer forming the core layer 64 is a GaInAsP layer, for example.

The semiconductor layer formed on the core layer 64 is processed in a mesa shape to form the upper clad layer 66. The semiconductor layer forming the upper clad layer 66 may be the same type of a semiconductor material as the semiconductor layer forming the lower clad layer 62, which may be an InP layer, for example.

Each of the first to fifth optical waveguides 10, 20, 30, 40, and 50 has the convex part 62a of the lower clad layer 62, the core layer 64, and the upper clad layer 66 integrally formed in a mesa shape having a predetermined mesa width and has the high-mesa structure that projects in a convex shape above the lower clad layer 62. Note that the high-mesa structure refers to mesa structure formed in a mesa shape in which, in a thickness direction of the optical waveguide having a lower clad layer, a core layer, and an upper clad layer, at least the upper clad layer and an upper part of the core layer project above the lower clad layer. The high-mesa structure includes mesa structure that is formed in a mesa shape in which, in the thickness direction of the optical waveguide, the upper clad layer, the core layer, and at least an upper part of the lower clad layer project above the lower clad layer and mesa structure that is formed in a mesa shape in which an upper clad layer and an upper part of a core layer project above the lower clad layer. While each of the first to fifth optical waveguides 10, 20, 30, 40, and 50 may be of any mesa structure, the present embodiment has the high-mesa structure formed in a mesa shape in which the upper clad layer 66, the core layer 64, and the convex part 62a of the lower clad layer 62 projects above the lower clad layer 62 as described above.

The first to fifth optical waveguides 10, 20, 30, 40, and 50 having the high-mesa structure are integrally formed on the substrate 60 and arranged so as to be aligned linearly. Note that residual parts 70 remain on both the sides of the third optical waveguide 30 obtained after the upper clad layer 66, the core layer 64, and the lower clad layer 62 are processed in a rectangular plane shape. The residual parts 70 are left by second mask parts 82 of a hard mask 80 (see FIG. 10A and FIG. 10C and FIG. 11A and FIG. 11C) used for adjusting an etching rate of dry etching for forming the first to fifth optical waveguides 10, 20, 30, 40, and 50 as described later. The residual parts 70 may be removed.

The first to fifth optical waveguides 10, 20, 30, 40, and 50 arranged linearly are optically connected to each other.

Specifically, one end of the first optical waveguide 10 is an input end into which a light to be guided by the first to fifth optical waveguides 10, 20, 30, 40, and 50 is input. Note that an element that outputs a light to be input to the one end of the first optical waveguide 10 can be optically connected via an optical waveguide or the like to the one end of the first optical waveguide 10 that is the input end. In this case, the element that outputs a light may be a semiconductor laser, an optical modulator, an optical amplifier, or the like, for example, and integrated on the same substrate 60 as the optical element 1 according to the present embodiment.

Further, the other end of the first optical waveguide 10 is optically connected to one end of the second optical waveguide 20. Thereby, the first optical waveguide 10 and the second optical waveguide 20 are optically connected to each other.

Further, the other end of the second optical waveguide 20 is optically connected to one end of the third optical waveguide 30. Thereby, the second optical waveguide 20 and the third optical waveguide 30 are optically connected to each other.

Further, the other end of the third optical waveguide 30 is optically connected to one end of the fourth optical waveguide 40. Thereby, the third optical waveguide 30 and the fourth optical waveguide 40 are optically connected to each other.

Further, the other end of the fourth optical waveguide 40 is optically connected to one end of the fifth optical waveguide 50. Thereby, the fourth optical waveguide 40 and the fifth optical waveguide 50 are optically connected to each other.

Further, the other end of the fifth optical waveguide 50 is an output end from which a light guided through the first to fifth optical waveguides 10, 20, 30, 40, and 50 is output. Note that an element that processes a light output from the other end of the fifth optical waveguide 50 can be optically connected via an optical waveguide or the like to the other end of the fifth optical waveguide 50 that is the output end. In this case, the element that processes an output light may be an optical modulator, an optical amplifier, or the like, for example, and integrated on the same substrate 60 as the optical element 1 according to the present embodiment.

In the optical element 1 according to the present embodiment, the mesa widths of the first to fifth optical waveguides 10, 20, 30, 40, and 50 are as described below. Note that a mesa width refers to a center width of the core layer 64 included in the high-mesa structure, that is, a width at the center in the thickness direction of the core layer 64 included in the high-mesa structure.

First, the first optical waveguide 10 is a linear optical waveguide and has substantially a constant mesa width $W_1$ from one end to the other end. Further, the fifth optical waveguide 50 is also a linear optical waveguide and has substantially a constant mesa width $W_5$ from one end to the other end. The mesa width $W_1$ of the first optical waveguide 10 is substantially the same as the mesa width $W_5$ of the fifth optical waveguide 50. Each of the mesa widths $W_1$ and $W_5$ is 1.5 to 2 μm, for example.

Further, the third optical waveguide 30 is a linear optical waveguide and has substantially a constant mesa width $W_3$ from one end to the other end. The mesa width $W_3$ of the third optical waveguide 30 is narrower than the mesa width $W_1$ of the first optical waveguide 10 and the mesa width $W_5$ of the fifth optical waveguide 50. The mesa width $W_3$ is 0.9 to 1.2 μm, for example.

Further, the second optical waveguide 20 is a linear optical waveguide and has a mesa width that gradually decreases from the mesa width $W_1$ of the first optical waveguide 10 to the mesa width $W_3$ of the third optical waveguide 30 from one end to the other end. Via the second optical waveguide 20 whose mesa width gradually decreases in such a way, the third optical waveguide 30 whose mesa width is narrower than that of the first optical waveguide 10 is optically connected to the first optical waveguide 10 in a continuous manner.

Further, the fourth optical waveguide 40 is a linear optical waveguide and has a mesa width that gradually increases from the mesa width $W_3$ of the third optical waveguide 30 to the mesa width $W_5$ of the fifth optical waveguide 50 from one end to the other end. Via the fourth optical waveguide 40 whose mesa width gradually increases in such a way, the third optical waveguide 30 whose mesa width is narrower than that of the fifth optical waveguide 50 is optically connected to the fifth optical waveguide 50 in a continuous manner.

Further, in the optical element 1 according to the present embodiment, the core heights of the first to fifth optical waveguides 10, 20, 30, 40, and 50 are as described below. Note that a core height refers to a height from the bottom face of a convex part of an optical waveguide having the high-mesa structure, that is, the bottom face on both sides of the high-mesa structure to the top face of the core layer 64 on the upper clad layer 66 side. That is, a core height is a mesa height to the top face of the core layer 64 on the upper clad layer 66 side of the optical waveguide having the high-mesa structure.

First, the first optical waveguide 10 has substantially a constant core height $d_1$ from one end to the other end. Further, the fifth optical waveguide 50 has substantially a constant core height $d_5$ from one end to the other end. The core height $d_1$ of the first optical waveguide 10 is substantially the same as the core height $d_5$ of the fifth optical waveguide 50.

Further, in the present embodiment, each of the core heights $d_1$ and $d_5$ of the first and fifth optical waveguides 10 and 50 is larger than a thickness $d_c$ of the core layer 64. Note that the thickness $d_c$ of the core layer 64 is substantially constant over the first to fifth optical waveguides 10, 20, 30, 40, and 50. The thickness $d_c$ of the core layer 64 of the first to fifth optical waveguides 10, 20, 30, 40, and 50 is not limited in particular. It is preferable for the thickness $d_c$ of the core layer 64 to be less than or equal to 2 μm in terms of reduction in size or reduction in thickness of the optical element 1. The thickness $d_c$ of the core layer 64 can be set to be greater than or equal to 0.2 μm, for example, from a calculation result illustrated in FIG. 6A to FIG. 8B described later.

Further, the third optical waveguide 30 has substantially a constant core height $d_3$ from one end to the other end. The core height $d_3$ of the third optical waveguides 30 is also larger than the thickness $d_c$ of the core layer 64. Further, the core height $d_3$ of the third optical waveguides 30 is lower than the core heights $d_1$ and $d_5$ of the first and fifth optical waveguides 10 and 50.

Further, the second optical waveguide 20 has a core height that gradually decreases from the core height $d_1$ of the first optical waveguide 10 to the core height $d_3$ of the third optical waveguide 30 from one end to the other end. Via the second optical waveguide 20 whose core height gradually decreases in such a way, the third optical waveguide 30 whose core height is lower than that of the first optical waveguide 10 is optically connected to the first optical waveguide 10 in a continuous manner.

Further, the fourth optical waveguide 40 has a core height that gradually increases from the core height $d_3$ of the third optical waveguide 30 to the core height $d_5$ of the fifth optical waveguide 50 from one end to the other end. Via the fourth optical waveguide 40 whose core height gradually increases in such a way, the third optical waveguide 30 whose core height is lower than that of the fifth optical waveguide 50 is optically connected to the fifth optical waveguide 50 in a continuous manner.

Note that the high-mesa structure of the first to fifth optical waveguides 10, 20, 30, 40, and 50 does not necessarily have a rectangular sectional shape in a strict sense as illustrated in FIG. 3A, FIG. 3B, and FIG. 3C, for example, as a sectional shape along a plane perpendicular to the waveguide direction of a light. The high-masa structure may have a sectional shape that is partially different from a rectangular sectional shape due to an etching condition or the like. FIG. 4A and FIG. 4B are sectional views illustrating another example of a sectional shape that may be taken by the high-masa structure of the optical waveguide.

For example, as illustrated in FIG. 4A, the high-mesa structure may have a skirt-shape portion S that has a width gradually increasing from the upper clad layer 66 side toward the lower clad layer 62 side. In this case, a core height $d_n$ of an optical waveguide having the high-mesa structure is a height, to the top face $T_c$ of the core layer 64 on the upper clad layer 66 side, from the bottom face $B_m$ of a convex part of the optical waveguide having the high-mesa structure, that is, the bottom face $B_s$ on both sides of the high-mesa structure.

Further, for example, a recess R may occur on both sides of the high-mesa structure as illustrated in FIG. 4B. The recess R includes a point P where the slope of the side face of the high-mesa structure is discontinuous to the bottom face $B_s$ on both sides of the high-mesa structure. In this case, the core height $d_n$ of the optical waveguide having the high-mesa structure is a height from the point P to the top face $T_c$ of the core layer 64 on the upper clad layer 66 side. This core height $d_n$ corresponds to the height from the bottom face $B_m$ located under the bottom face $B_s$ to the top face $T_c$.

As discussed above, the core height $d_n$ is defined as the height, to the top face $T_c$ of the core layer 64, from the bottom face $B_s$ on both sides of the high-mesa structure or the point P where the slope of the side face of the high-mesa structure is discontinuous toward the bottom face $B_s$.

In the optical element 1 according to the present embodiment described above, the equivalent refractive index in the fundamental mode and a higher order mode of the third optical waveguide 30 has the following relationship with the refractive index of the substrate 60. That is, the equivalent refractive index in the fundamental mode of the third optical waveguide 30 is higher than the refractive index of the substrate 60. In contrast, the equivalent refractive index in the higher order mode of the third optical waveguide 30 is lower than the refractive index of the substrate 60. Thereby, in the third optical waveguide 30, the higher order mode is more likely to be emitted to the substrate 60 side compared to the fundamental mode. As described above, with an equivalent refractive index being set, the higher-order mode loss is larger than the fundamental mode loss in the third optical waveguide 30. The equivalent refractive index can be derived by a generally known equivalent refractive index method with respect to a two-dimensional light confinement such as the high-mesa structure. First, under an assumption of no mesa shape being provided, the structure in only the stack direction (clad/core/clad), that is, three-layer slab structure is assumed. The eigen mode of the three-layer slab in the vertical direction is calculated, and an equivalent refractive index in the vertical direction is derived from a propagation constant $\beta$ at this time. The equivalent refractive method is to define an equivalent refractive index in the vertical direction as a refractive index of the core layer of the three-layer slab in the horizontal direction and calculate the eigen mode in the horizontal direction. The equivalent refractive index of the waveguide is derived from the propagation constant $\beta$ of the eigen mode calculated by the equivalent refractive index method. Note that, of propagation modes in the optical waveguide, the 0th-order mode is called a fundamental mode, and the Nth-order modes (where N is an integer greater than or equal to one) are collectively referred to as a higher order mode.

In the optical element 1 according to the present embodiment configured as described above, the higher-order mode loss is the largest in the third optical waveguide 30 of the first to fifth optical waveguides 10, 20, 30, 40, and 50. Thus, the third optical waveguide 30 is a filter part that functions as a higher order mode filter for sufficiently reducing or removing a higher order mode.

On the other hand, each of the first optical waveguide 10 and the fifth optical waveguide 50 can be a quasi-single or multimode optical waveguide.

In an optical waveguide, to increase a higher-order mode loss, one conceivable way is to decrease the mesa width of the optical waveguide. However, an excessively narrow mesa width causes the fundamental mode to be emitted to the substrate side and increases the fundamental mode loss together. Thus, such a design solution exists that satisfies a so-called single-mode property in which the fundamental mode loss is low and the higher-order mode loss is high. Although a design solution exists in such a way, tolerance that can satisfy the single-mode property is small, and it will be difficult to satisfy the single-mode property when designing an optical waveguide having a high refractive index of a core layer, such as a semiconductor optical waveguide, for example.

Furthermore, in an optical waveguide having the mesa structure such as high-mesa structure, since the refractive index difference is high, a scattering loss on the mesa side face is a major problem. Thus, in order to realize a low-loss optical waveguide, it is necessary to widen the mesa width of an optical waveguide as much as possible as long as the single-mode property is satisfied, and thus the condition is more severe.

In an optical waveguide required to satisfy low-loss and single-mode properties, a fabrication accuracy of ±0.1 lam or higher is required, for example, and there is a problem of difficulty in fabrication due to such a severe required tolerance. In order to overcome such a problem, a higher order mode filter that removes or reduces a higher order mode has been proposed so far. In the proposed higher order mode filter, suppression of a higher order mode is performed by setting the thickness of a lower clad layer in an optical waveguide having the mesa structure below a predetermined thickness or the like (see Patent Literatures 1 and 2).

In an optical waveguide in which the fundamental mode loss is small, however, there is a problem that the higher-order mode loss does not increase even when the core height is reduced by the thickness of the lower clad layer or the like being reduced.

Figure 5:
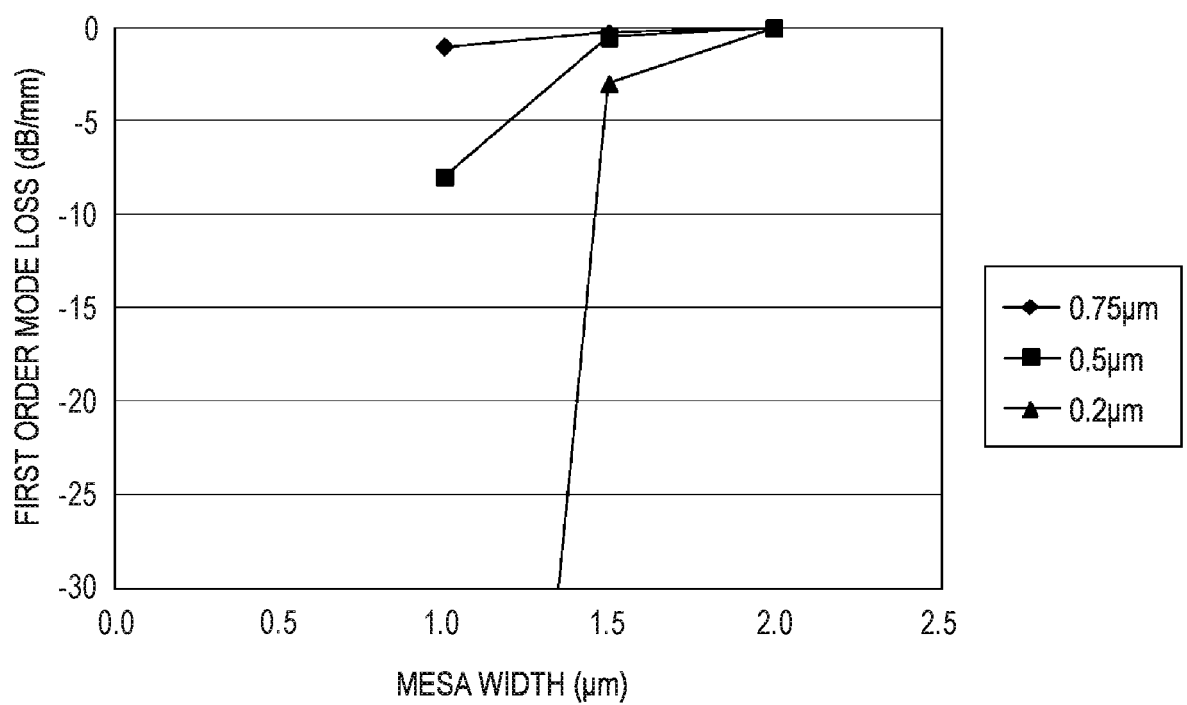
FIG. 5 is graph illustrating an example of a calculation result in a beam propagation method in a relationship between a mesa width and a higher-order mode loss obtained for different under-core depths.
Figure 9A:
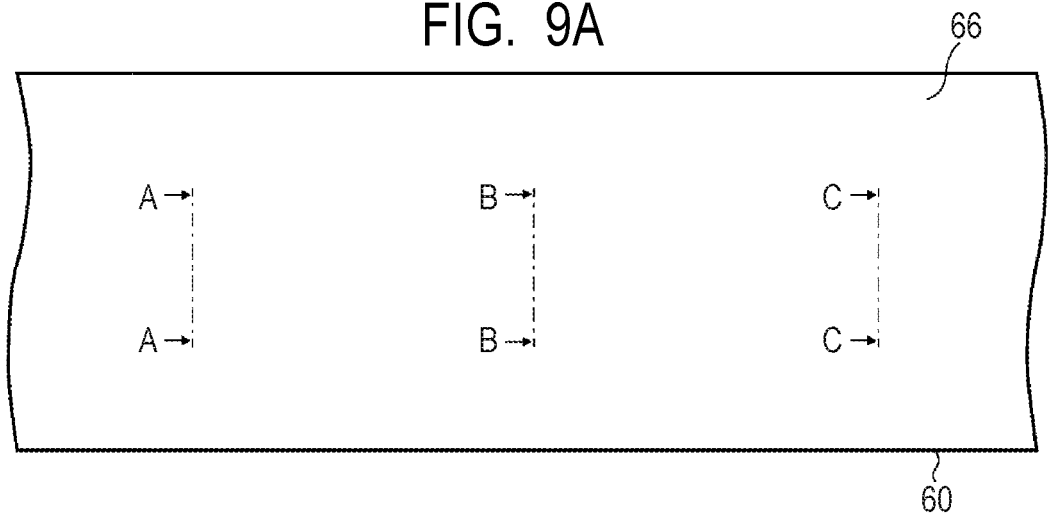
FIG. 9A is a process diagram (part 1-1) illustrating a manufacturing method of the optical element according to the first embodiment of the present invention.
Figure 9B:
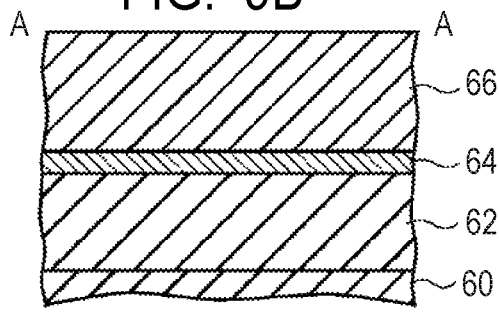
FIG. 9B is a process diagram (part 1-2) illustrating the manufacturing method of the optical element according to the first embodiment of the present invention.
Figure 9C:
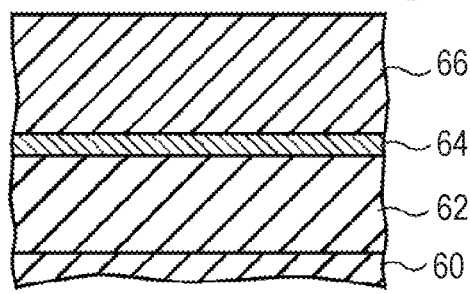
FIG. 9C is a process diagram (part 1-3) illustrating the manufacturing method of the optical element according to the first embodiment of the present invention.
Figure 9D:
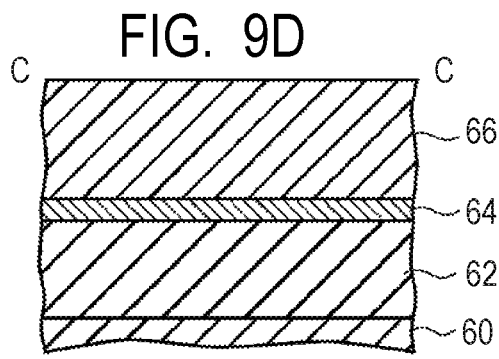
FIG. 9D is a process diagram (part 1-4) illustrating the manufacturing method of the optical element according to the first embodiment of the present invention.

FIG. 5 is a graph illustrating an example of a calculation result in a beam propagation method in a relationship between a mesa width and a higher-order mode loss obtained for different under-core depths. Note that the under-core depth refers to a depth from the under surface of the core layer on the lower clad layer side in an optical waveguide of the high-mesa structure to the bottom face of the convex part of the optical waveguide. The under-core depth can be calculated as a difference between a core height and a core layer thickness. FIG. 5 illustrates calculation results of the relationship between a mesa width and the loss of the first order mode, which is one of the higher order modes, for cases where the under-core depth is 0.75 µm, 0.5 µm, and 0.2 µm, respectively.

As illustrated in FIG. 5, in the waveguide of a mesa width of 1.5 to 2 µm that is easily fabricated, it can be understood that, even with a shallower under-core depth, the first order mode loss does not sufficiently increase. Further, the fundamental mode loss increases in the waveguide of a mesa width of 1 µm that causes a larger first order mode loss. When the higher-order mode loss is not sufficiently large in such a way, it is necessary to increase the element length of a filter for sufficiently reducing a higher order mode, which would increase the chip size and also increase the fundamental mode loss.

In contrast, in the optical element 1 according to the present embodiment, the mesa width $W_3$ of the third optical waveguide 30 is narrower than the mesa width $W_1$ of the first optical waveguide 10 and the mesa width $W_5$ of the fifth optical waveguide 50. Furthermore, in the optical element 1 according to the present embodiment, the core height $d_3$ of the third optical waveguide 30 is lower than the core height $d_1$ of the first optical waveguide 10 and the core height $d_5$ of the fifth optical waveguide 50. In other words, the under-core depth $(d_3-d_c)$ of the third optical waveguide 30 is shallower than under-core depth $(d_1-d_c)$ of the first optical waveguide 10 and the under-core depth $(d_5-d_c)$ of the fifth optical waveguide 50.

As discussed above, the third optical waveguide 30 has a narrower mesa width and a lower core height than the first optical waveguide 10 and the fifth optical waveguide 50 and, in other words, has a shallower under-core depth. Since both of the mesa width and the core height are set in such a way, the optical element 1 according to the present embodiment can sufficiently reduce or remove a higher order mode while suppressing the fundamental mode loss to a lower level by using the third optical waveguide 30 that functions as a filter unit.

Further, since a sufficiently large higher-order mode loss in the third optical waveguide 30 is obtained in the optical element 1 according to the present embodiment, the waveguide length of the third optical waveguide 30 can be reduced. For example, the waveguide length of the third optical waveguide 30 can be reduced such as 0.1 mm or less. As discussed above, in the present embodiment, the waveguide length of the third optical waveguide 30 can be reduced, and thus the element length of the optical element 1 can be reduced.

Furthermore, in the optical element 1 according to the present embodiment, both the mesa width and the core height of the third optical waveguide 30 is set as described above, and thereby a function of a higher order mode filter is realized. Thus, compared to the case where a higher order mode filter is realized by reduction of only the mesa width, a wider tolerance in design can be ensured, and thus flexibility of design can be increased in the present embodiment.

FIG. 6A and FIG. 6B are diagrams illustrating an example of a result of a fundamental mode loss and a higher-order mode loss of a light propagating in the optical element 1 when the under-core depth $(d_3-d_c)$ and the mesa width $W_3$ of the third optical waveguide 30 in the optical element 1 are changed, which is calculated by a beam propagation method. FIG. 6A is a table illustrating a calculation result of the fundamental mode loss. FIG. 6B is a table illustrating a calculation result of the first order mode loss that is a higher order mode. Note that, in calculation for the result illustrated in FIG. 6A and FIG. 6B, the thickness $d_c$ of the core layer 64 is set to 600 nm. Each of the mesa width $W_1$ of the first optical waveguide 10 and the mesa width $W_5$ of the fifth optical waveguide 50 is fixed to 1.5 µm. Further, each of the under-core depth $(d_1-d_c)$ of the first optical waveguide 10 and the under-core depth $(d_5-d_c)$ of the fifth optical waveguide 50 is fixed to 0.5 µm. Further, the waveguide length of the third optical waveguide 30 is set to 50 µm.

In FIG. 6A, the region where the fundamental mode loss is below 0.1 dB is a region where the fundamental mode loss is sufficiently reduced. Further, in FIG. 6B, the region where the first order mode loss exceeds 5 dB is a region where the first order mode loss is sufficiently increased.

Further, FIG. 7A and FIG. 7B are diagrams illustrating another example of a result of a fundamental mode loss and a higher-order mode loss of a light propagating in the optical element 1 when the under-core depth $(d_3-d_c)$ and the mesa width $W_3$ of the third optical waveguide 30 in the optical element 1 are changed, which is calculated by a beam propagation method. FIG. 7A is a table illustrating a calculation result of the fundamental mode loss. FIG. 7B is a table illustrating a calculation result of the loss of the first order mode that is a higher order mode. Note that, in calculation for the result illustrated in FIG. 7A and FIG. 7B, the thickness $d_c$ of the core layer 64 is set to 200 nm. Each of the mesa width $W_1$ of the first optical waveguide 10 and the mesa width $W_5$ of the fifth optical waveguide 50 is fixed to 2 µm. Further, each of the under-core depth $(d_1-d_c)$ of the first optical waveguide 10 and the under-core depth $(d_5-d_c)$ of the fifth optical waveguide 50 is fixed to 0.5 µm. Further, the waveguide length of the third optical waveguide 30 is set to 50 µm. Note that blanks in the tables of FIG. 7A and FIG. 7B indicate that calculation has not been made.

Also in FIG. 7A, the region where the fundamental mode loss is below 0.1 dB is a region where the fundamental mode loss is sufficiently reduced. Further, in FIG. 7B, the region where the first order mode loss exceeds 5 dB is a region where the first order mode loss is sufficiently increased.

Further, FIG. 8A and FIG. 8B are diagrams illustrating another example of a result of a fundamental mode loss and a higher-order mode loss of a light propagating in the optical element 1 when the under-core depth $(d_3-d_c)$ and the mesa width $W_3$ of the third optical waveguide 30 in the optical element 1 are changed, which is calculated by a beam propagation method. FIG. 8A is a table illustrating a calculation result of the fundamental mode loss. FIG. 8B is a table illustrating a calculation result of the first order mode loss that is a higher order mode. Note that, in calculation for the result illustrated in FIG. 8A and FIG. 8B, the thickness $d_c$ of the core layer 64 is set to 400 nm. Each of the mesa width $W_1$ of the first optical waveguide 10 and the mesa width $W_5$ of the fifth optical waveguide 50 is fixed to 2 µm. Further, each of the under-core depth $(d_1-d_c)$ of the first optical waveguide 10 and the under-core depth $(d_5-d_c)$ of the fifth optical waveguide 50 is fixed to 0.5 µm. Further, the waveguide length of the third optical waveguide 30 is set to 50 µm. Note that blanks in the tables of FIG. 8A and FIG. 8B indicate that calculation has not been made.

It can be seen from the calculation result indicated in FIG. 6A to FIG. 8B described above that, when the under-core depth $(d_3-d_c)$ of the third optical waveguide 30 is less than or equal to 0.3 µm, there is such a mesa width that allows a sufficiently small fundamental mode loss and a sufficiently large first order mode loss in any design. Therefore, when the third optical waveguide 30 has the high-mesa structure formed in a mesa shape in which the upper clad layer 66, the core layer 64, and the convex part 62a of the of the lower clad layer 62 project above the lower clad layer 62, it is preferable to set the under-core depth $(d_3-d_c)$ of the third optical waveguide 30 to be less than or equal to 0.3 µm. By setting the under-core depth $(d_3-d_c)$ of the third optical waveguide 30 as discussed above, it is possible to sufficiently reduce or remove a higher order mode while suppressing the fundamental mode loss to a sufficiently low level.

Note that the mesa width $W_3$ of the third optical waveguide 30 can be set as appropriate in accordance with design.

Further, it is preferable for the core layer thickness $d_c$ to be larger than or equal to 200 nm from the calculation result illustrated in FIG. 6A to FIG. 8B described above.

Next, a manufacturing method of the optical element according to the present embodiment will be described by using FIG. 9A to FIG. 12D. FIG. 9A, FIG. 10A, FIG. 11A, and FIG. 12A are process plan views illustrating the manufacturing method of the optical element according to the present embodiment. FIG. 9B, FIG. 10B, FIG. 11B, and FIG. 12B are process sectional views taken along the line A-A of FIG. 9A, FIG. 10A, FIG. 11A, and FIG. 12A, respectively. FIG. 9C, FIG. 10C, FIG. 11C, and FIG. 12C are process sectional views taken along the line B-B of FIG. 9A, FIG. 10A, FIG. 11A, and FIG. 12A, respectively. FIG. 9D, FIG. 10D, FIG. 11D, and FIG. 12D are process sectional views taken along the line C-C of FIG. 9A, FIG. 10A, FIG. 11A, and FIG. 12A, respectively.

First, on the substrate 60 that is an InP substrate, for example, the lower clad layer 62 made of an InP layer, the core layer 64 made of a GaInAsP layer, and the upper clad layer 66 made of an InP layer are epitaxially grown by an organic metal vapor growth method, for example (see FIG. 9A to FIG. 9D). In this way, the lower clad layer 62, the core layer 64, and the upper clad layer 66 are stacked on the substrate 60. Note that the substrate 60 may be used as the lower clad layer 62.

Next, on the upper clad layer 66, a silicon oxide film that is used as a hard mask is deposited by a chemical vapor growth method, for example. Next, a silicon oxide film is patterned by photolithography and etching. Thereby, the hard mask 80 made of a silicon oxide film is formed (see FIG. 10A to FIG. 10D). The hard mask 80 formed in such a way has a first mask part 81 having waveguide patterns 81a, 81b, 81c, 81d, and 81e of the first to fifth optical waveguides 10, 20, 30, 40, and 50. Furthermore, the hard mask 80 has second mask parts 82 formed on both sides of the waveguide pattern 81c of the third optical waveguide 30 in the first mask part 81.

Note that a film forming the hard mask 80 is not limited to a silicon oxide film. As a film forming the hard mask 80, any inorganic film or other films that can be a mask in dry etching can be used other than the silicon oxide film.

In the first mask part 81, the width of the waveguide pattern 81c of the third optical waveguide 30 is narrower than the width of the waveguide pattern 81a of the first optical waveguide 10 and the width of the waveguide pattern 81e of the fifth optical waveguide 50. In such a way, the first mask part 81 has a width in accordance with the width relationship among the mesa widths $W_1$, $W_3$, and $W_5$ of the first, third, and fifth optical waveguides 10, 30, and 50 described above.

The second mask parts 82 are for reducing an etching rate of dry etching in a portion where the third optical waveguide 30 is formed when the first to fifth optical waveguides 10, 20, 30, 40, and 50 are formed by dry etching. The second mask parts 82 are formed in regions on both sides of the waveguide pattern 81c of the third optical waveguide 30. No hard mask is formed on both the sides of the waveguide patterns 81a, 81b, 81d, and 81e of the first, second, fourth, and fifth optical waveguides 10, 20, 40, and 50 resulting in portions where the upper clad layer 66 is exposed.

As discussed above, the second mask parts 82 are selectively formed in regions on both sides of the waveguide pattern 81c of the third optical waveguide 30 out of regions on both sides of the waveguide patterns 81a, 81b, 81c, 81d, and 81e of the first to fifth optical waveguides 10, 20, 30, 40, and 50.

Next, a hard mask 80 having the first mask part 81 and the second mask parts 82 is used as a mask to etch the upper clad layer 66, the core layer 64, and the upper part of the lower clad layer 62. For example, reactive ion etching may be used for dry etching. The upper clad layer 66, the core layer 64, and the upper part of the lower clad layer 62 is anisotropically etched by dry etching. Thereby, the upper clad layer 66, the core layer 64, and the upper part of the lower clad layer 62 is processed in a mesa shape.

As described above, the second mask parts 82 are selectively formed in regions on both sides of the waveguide pattern 81c of the third optical waveguide 30 in the first mask part 81. Thus, the etching rate of dry etching in a portion where the third optical waveguide 30 is formed is reduced by a micro loading effect. That is, the etching rate of dry etching in a portion where the third optical waveguide 30 is formed is lower than the etching rate of dry etching in a portion where the first, second, fourth, and fifth optical waveguides 10, 20, 40, and 50 are formed. Thereby, the third optical waveguide 30 having the core height $d_3$ that is lower than the core height $d_1$ of the first optical waveguide 10 and the core height $d_5$ of the fifth optical waveguide 50 can be formed.

Note that, in order to sufficiently obtain the micro lading effect, it is preferable that the distance $D_m$ between the waveguide pattern 81c of the third optical waveguide 30 and the second mask part 82 in the first mask part 81 be less than or equal to 10 μm.

In such a way, the first to fifth optical waveguides 10, 20, 30, 40, and 50 having the high-mesa structure whose mesa width and core height are set described above are formed (see FIG. 11A to FIG. 11D).

The hard mask 80 used as a mask is then removed, and the optical element 1 according to the present embodiment is completed (see FIG. 12A to FIG. 12D).

As discussed above, in the present embodiment, the third optical waveguide 30 having the core height $d_3$ that is lower than the core height $d_1$ of the first optical waveguide 10 and the core height $d_5$ of the fifth optical waveguide 50 can be formed without requiring an additional process. Therefore, according to the present embodiment, the optical element 1 can be easily manufactured at low cost.

Figure 10A:
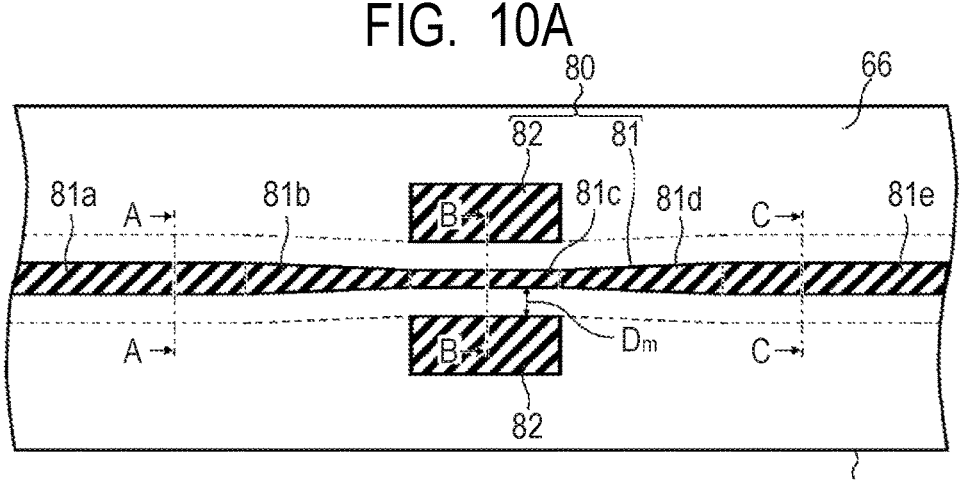
FIG. 10A is a process diagram (part 2-1) illustrating a manufacturing method of the optical element according to the first embodiment of the present invention.
Figure 10B:
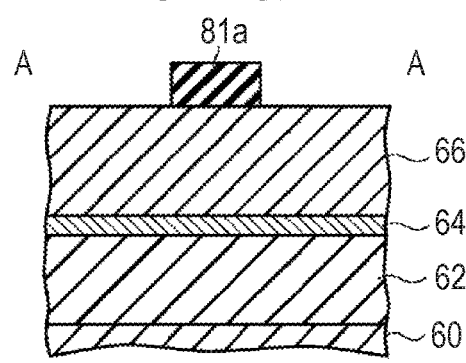
FIG. 10B is a process diagram (part 2-2) illustrating a manufacturing method of the optical element according to the first embodiment of the present invention.
Figure 10C:
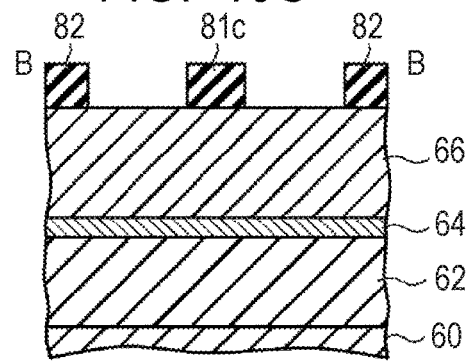
FIG. 10C is a process diagram (part 2-3) illustrating a manufacturing method of the optical element according to the first embodiment of the present invention.
Figure 10D:
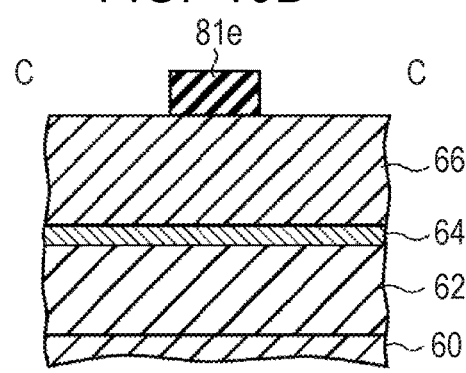
FIG. 10D is a process diagram (part 2-4) illustrating a manufacturing method of the optical element according to the first embodiment of the present invention.
Figure 11A:
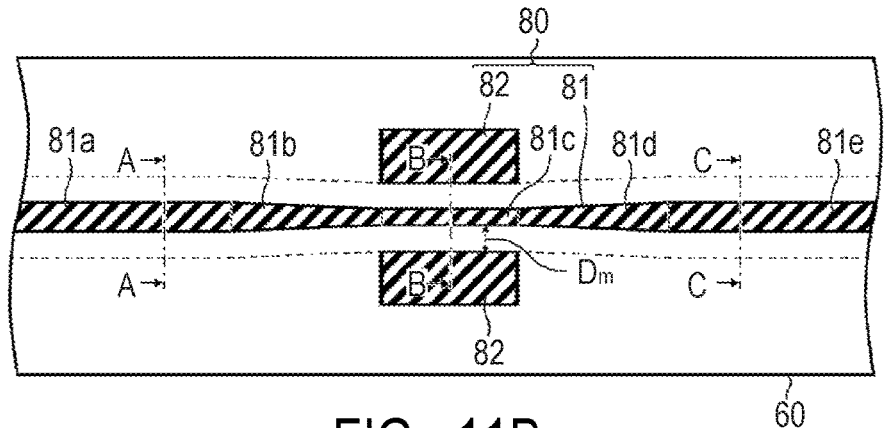
FIG. 11A is a process diagram (part 3-1) illustrating a manufacturing method of the optical element according to the first embodiment of the present invention.
Figure 11B:
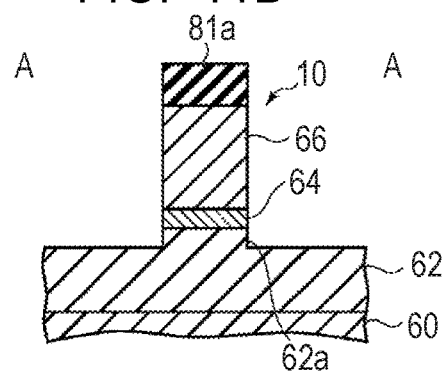
FIG. 11B is a process diagram (part 3-2) illustrating a manufacturing method of the optical element according to the first embodiment of the present invention.
Figure 11C:
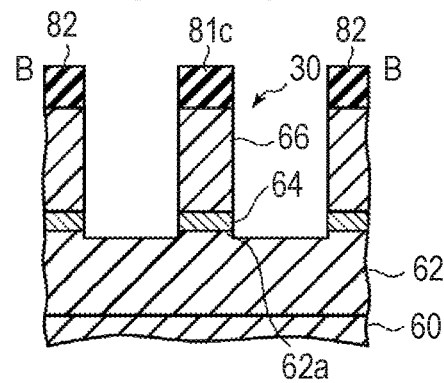
FIG. 11C is a process diagram (part 3-3) illustrating a manufacturing method of the optical element according to the first embodiment of the present invention.
Figure 11D:
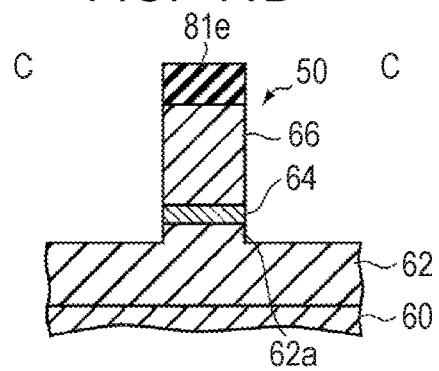
FIG. 11D is a process diagram (part 3-4) illustrating a manufacturing method of the optical element according to the first embodiment of the present invention.
Figure 12A:
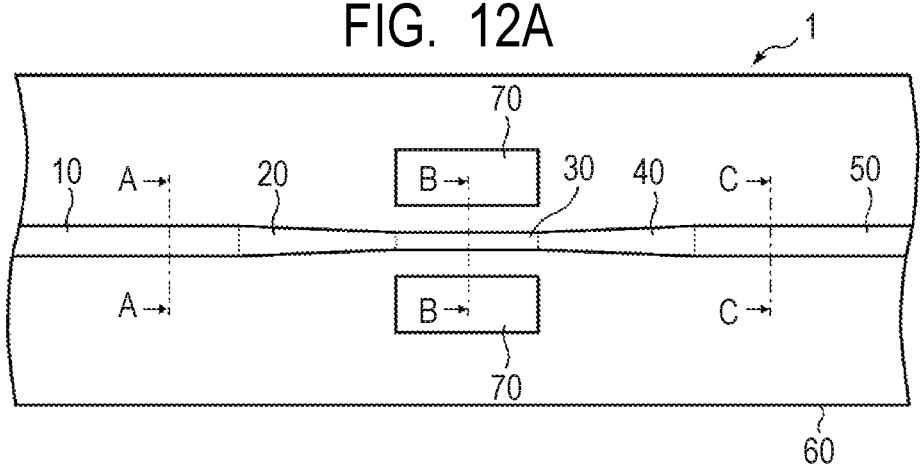
FIG. 12A is a process diagram (part 4-1) illustrating a manufacturing method of the optical element according to the first embodiment of the present invention.
Figure 12B:
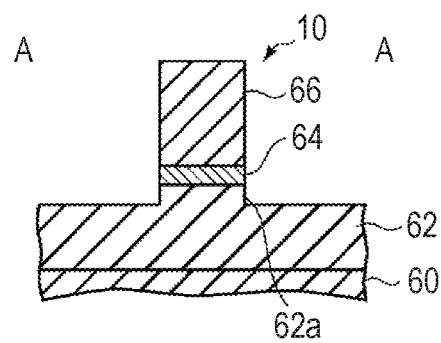
FIG. 12B is a process diagram (part 4-2) illustrating a manufacturing method of the optical element according to the first embodiment of the present invention.
Figure 12C:
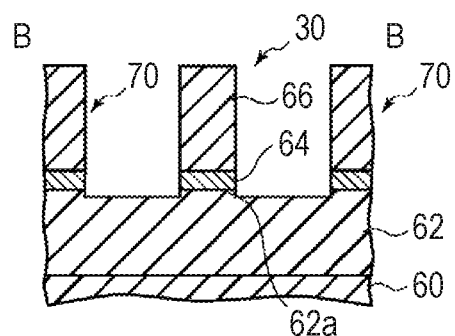
FIG. 12C is a process diagram (part 4-3) illustrating a manufacturing method of the optical element according to the first embodiment of the present invention.
Figure 12D:
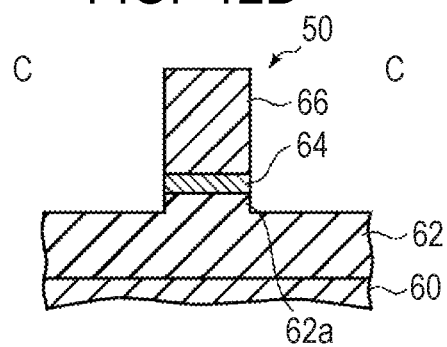
FIG. 12D is a process diagram (part 4-4) illustrating a manufacturing method of the optical element according to the first embodiment of the present invention.
Figure 13:
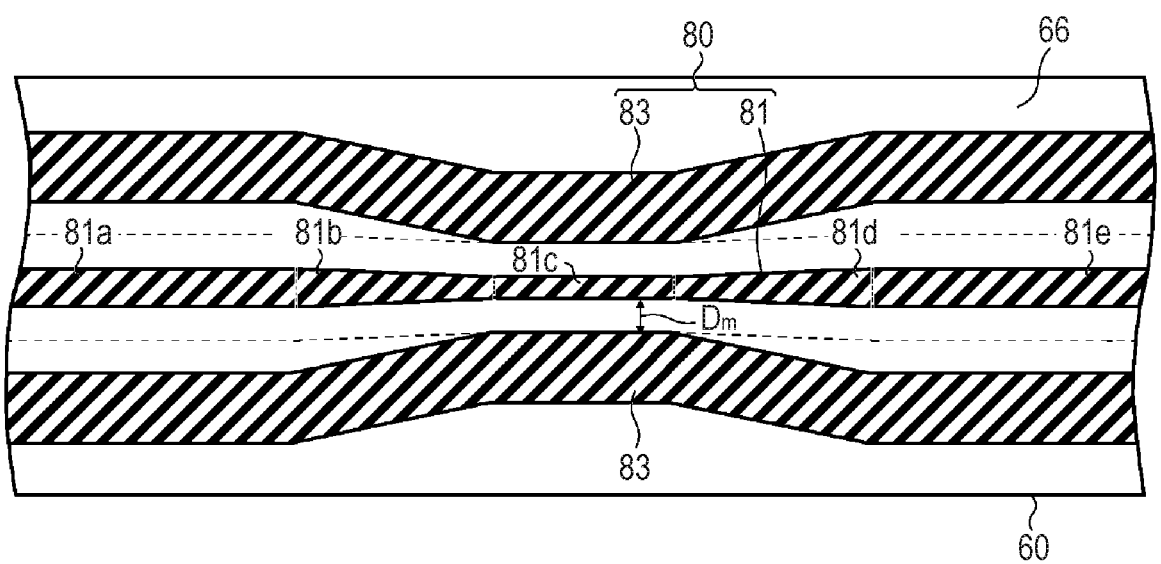
FIG. 13 illustrates a modified example of a hard mask in a manufacturing method of the optical element according to the first embodiment of the present invention.

Note that the second mask parts 82 in the hard mask 80 are not limited to the planar shape depicted in FIG. 10A illustrated above. FIG. 13 is a plan view illustrating another example of the hard mask 80 in the manufacturing method of the optical element according to the present embodiment.

As illustrated in FIG. 13, the hard mask 80 has the first mask part 81 similar to the case illustrated in FIG. 10A and second mask parts 83. The second mask parts 83 are formed in a belt shape on both sides of the first mask part 81.

On both sides of the waveguide pattern 81a of the first optical waveguide 10 in the first mask part 81, the second mask parts 83 are formed substantially in parallel to each other spaced apart by substantially a constant distance from each other. The distance between the waveguide pattern 81a of the first optical waveguide 10 in the first mask part 81 and the second mask part 83 is larger than the distance $D_m$ between the waveguide pattern 81c of the third optical waveguide 30 in the first mask part 81 and the second mask part 83.

On both sides of the waveguide pattern 81b of the second optical waveguide 20 in the first mask part 81, the second mask parts 83 are formed to be gradually closer to each other from the waveguide pattern 81a side of the first optical waveguide 10 toward the waveguide pattern 81c side of the third optical waveguide 30. The distance between the waveguide pattern 81b of the second optical waveguide 20 in the first mask part 81 and the second mask part 83 is larger than the distance $D_m$ between the waveguide pattern 81c of the third optical waveguide 30 in the first mask part 81 and the second mask part 83.

On both sides of the waveguide pattern 81d of the fourth optical waveguide 40 in the first mask part 81, the second mask parts 83 are formed to be gradually more distant from each other from the waveguide pattern 81c side of the third optical waveguide 30 toward the waveguide pattern 81e side of the fifth optical waveguide 50. The distance between the waveguide pattern 81d of the fourth optical waveguide 40 in the first mask part 81 and the second mask part 83 is larger than the distance $D_m$ between the waveguide pattern 81c of the third optical waveguide 30 in the first mask part 81 and the second mask part 83.

On both sides of the waveguide pattern 81e of the fifth optical waveguide 50 in the first mask part 81, the second mask parts 83 are formed substantially in parallel to each other spaced apart by substantially a constant distance from each other. The distance between the waveguide pattern 81e of the fifth optical waveguide 50 in the first mask part 81 and the second mask part 83 is larger than the distance $D_m$ between the waveguide pattern 81c of the third optical waveguide 30 in the first mask part 81 and the second mask part 83.

As discussed above, the second mask parts 83 may be formed in regions on both sides of the waveguide patterns 81a, 81b, 81c, 81d, and 81e of the first to fifth optical waveguides 10, 20, 30, 40, and 50. Also in this case, the second mask parts 83 have portions selectively formed in regions on both sides of the waveguide pattern 81c of the third optical waveguide 30 in regions spaced apart by a constant distance from the first mask part 81. That is, the second mask parts 83 are selectively formed on both sides of the waveguide pattern 81c of the third optical waveguide 30 in the regions distant by the distance $D_m$ in regions on both sides of the waveguide patterns 81a, 81b, 81c, 81d, and 81e of the first to fifth optical waveguides 10, 20, 30, 40, and 50.

In the case depicted in FIG. 13 illustrated above, the spacing between the second mask part 83 and the waveguide pattern 81c of the third optical waveguide 30 in the first mask part 81 is narrower than the spacing between the second mask part 83 and the waveguide pattern 81a of the first optical waveguide 10 in the first mask part 81. Further, the spacing between the second mask part 83 and the waveguide pattern 81c of the third optical waveguide 30 in the first mask part 81 is narrower than the spacing between the second mask part 83 and the waveguide pattern 81b of the second optical waveguide 20 in the first mask part 81. Further, the spacing between the second mask part 83 and the waveguide pattern 81c of the third optical waveguide 30 in the first mask part 81 is narrower than the spacing between the second mask part 83 and the waveguide pattern 81d of the fourth optical waveguide 40 in the first mask part 81. Further, the spacing between the second mask part 83 and the waveguide pattern 81c of the third optical waveguide 30 in the first mask part 81 is narrower than the spacing between the second mask part 83 and the waveguide pattern 81e of the fifth optical waveguide 50 in the first mask part 81.

Note that, also in the case depicted in FIG. 13, it is preferable that the distance $D_m$ between the waveguide pattern 81c of the third optical waveguide 30 in the first mask part 81 and the second mask part 83 be less than or equal to 10 μm as described above.

When the hard mask 80 depicted in FIG. 13 illustrated above is used to perform etching, residual parts in which the upper clad layer 66, the core layer 64, and the lower clad layer 62 have been processed in a belt-like planar shape remain on both sides of the first to fifth optical waveguides 10, 20, 30, 40, and 50.

Second Embodiment

Figure 14:
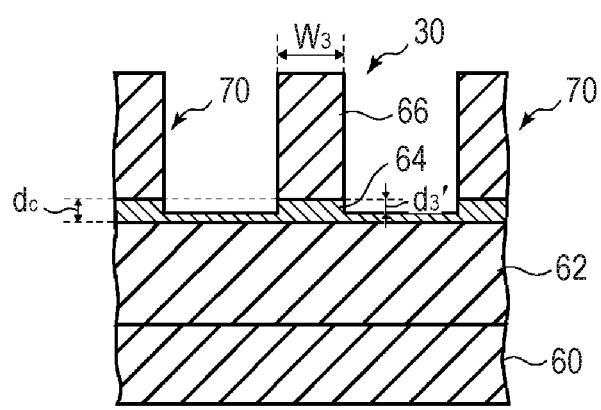
FIG. 14 illustrates a third optical waveguide in an optical element according to a second embodiment of the present invention.

An optical element and a manufacturing method thereof according to a second embodiment of the present invention will be described by using FIG. 14. FIG. 14 is a sectional view illustrating the third optical waveguide in the optical element according to the present embodiment. Note that the same components as those in the optical element and the manufacturing method thereof according to the first embodiment described above are labeled with the same reference numerals, and the description thereof will be omitted or simplified.

The basic configuration of the optical element according to the present embodiment is substantially the same as the configuration of the optical element 1 according to the first embodiment. The optical element according to the present embodiment has the high-mesa structure in which the third optical waveguide 30 is formed in a mesa shape from the upper clad layer 66 to the upper part of the core layer 64. In this regard, the optical element according to the present embodiment is different from the optical element according to the first embodiment having the high-mesa structure in which the third optical waveguide 30 is formed in a mesa shape from the upper clad layer 66 to the upper part of the lower clad layer 62.

As illustrated in FIG. 14, in the optical element according to the present embodiment, the third optical waveguide 30 has the high-mesa structure formed in the mesa shape in which the upper clad layer 66 and an upper part of the core layer 64 project above the lower clad layer 62 in the thickness direction.

In the third optical waveguide 30 in the present embodiment, the bottom face of the convex part of the third optical waveguide 30 is located in the core layer 64. Thus, the core height d3' of the third optical waveguide 30 in the present embodiment is equal to the height from the bottom face of the convex part located in the core layer 64 to the top face of the core layer 64 on the upper clad layer 66 side. That is, the core height d3' is smaller than the thickness $d_c$ of the core layer 64.

As seen in the optical element according to the present embodiment, the third optical waveguide 30 may have the high-mesa structure formed in a mesa shape from the upper clad layer 66 to the upper part of the core layer 64.

Further, the first, second, fourth, and fifth optical waveguides 10, 20, 40, and 50 may also have the high-mesa structure formed in a mesa shape in which the upper clad layer 66 and an upper part of the core layer 64 project above the lower clad layer 62 in the thickness direction thereof in a similar manner to the third optical waveguide 30 described above.

The optical element according to the present embodiment can also be manufactured by utilizing reduction of an etching rate due to the micro loading effect in a similar manner to the optical element 1 according to the first embodiment. Therefore, the optical element according to the present embodiment can also be easily manufactured at low cost.

Note that, in the case of the optical element according to the present embodiment, in dry etching using the hard mask 80, the end point of the dry etching is changed from that in the first embodiment, and the dry etching is performed from the upper clad layer 66 to an upper part of the core layer 64.

Third Embodiment

Figure 15A:
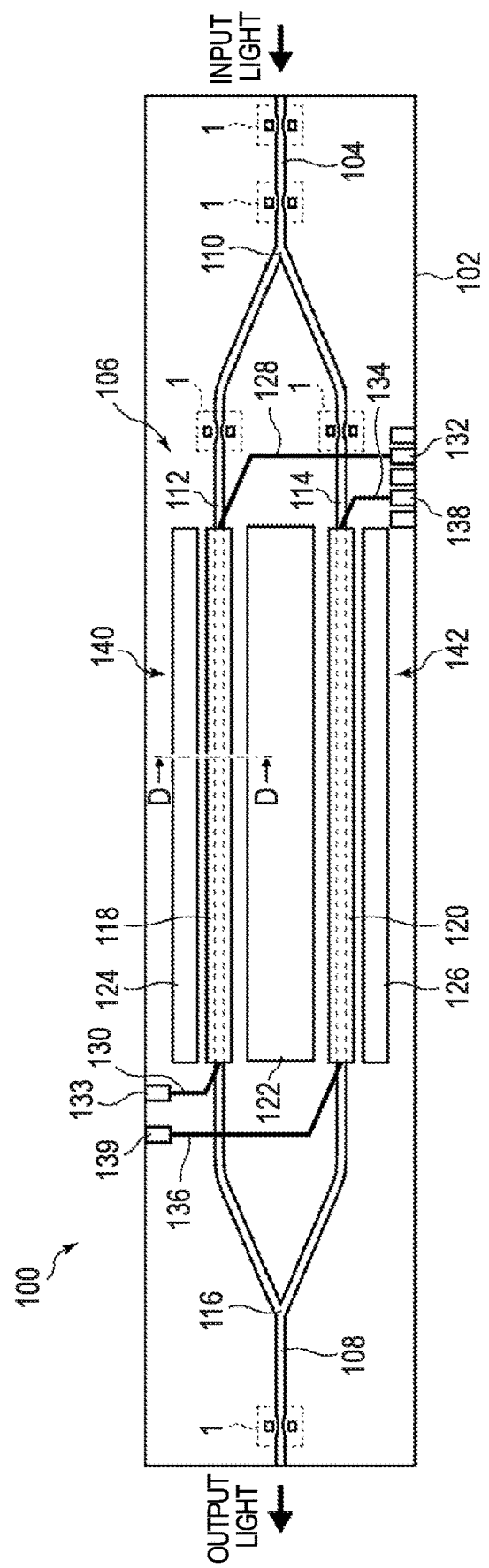
FIG. 15A is a schematic diagram (part 1) illustrating an optical modulator according to a third embodiment of the present invention.
Figure 15B:
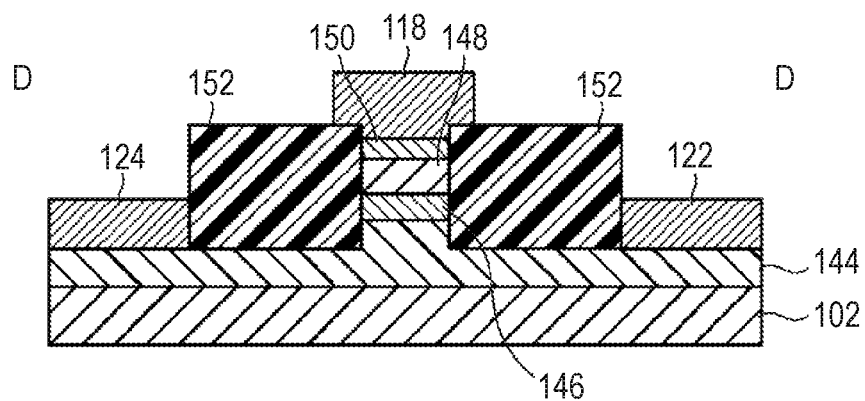
FIG. 15B is a schematic diagram (part 2) illustrating the optical modulator according to the third embodiment of the present invention.

An optical modulator according to a third embodiment of the present invention will be described by using FIG. 15A and FIG. 15B. FIG. 15A and FIG. 15B are schematic diagrams illustrating the optical modulator according to the present embodiment. Note that the same components as those in the optical element and the manufacturing method thereof according to the first and second embodiments described above are labeled with the same reference numerals, and the description thereof will be omitted or simplified.

The optical element according to the first and second embodiments described above can be integrated on a semiconductor substrate together with an active element such as an optical modulator and other elements to form an optical integrated element. In the present embodiment, an example of such an optical integrated element will be described. Specifically, the optical modulator according to the present embodiment is a Mach-Zehnder optical modulator and has a plurality of the optical elements 1 according to the first embodiment formed and inserted in predetermined locations of the optical waveguide thereof.

The configuration of the optical modulator according to the present embodiment will be described below by using FIG. 15A and FIG. 15B. FIG. 15A is a plan view illustrating an optical modulator according to the present embodiment, and FIG. 15B is a sectional view taken along the line D-D of FIG. 15A.

As illustrated in FIG. 15A, an optical modulator 100 according to the present embodiment has an input-side optical waveguide 104, a Mach-Zehnder interferometer 106, and an output-side optical waveguide 108. The input-side optical waveguide 104, the Mach-Zehnder interferometer 106, and the output-side optical waveguide 108 are integrally formed on a substrate 102 that is a semiconductor substrate.

The input-side optical waveguide 104 has one end located at one end of both the opposite ends of the substrate 102 and the other end optically connected to the input end of the Mach-Zehnder interferometer 106 forming a modulation unit. The one end of the input-side optical waveguide 104 is an input end to which an input light to be input to the optical modulator 100 according to the present embodiment is input. The input light is a light output from a light source such as a not-shown semiconductor laser, for example. Note that a light source such as a semiconductor laser can be integrated in a monolithic manner on the same substrate 102 as that for the optical modulator 100 according to the present embodiment.

The output-side optical waveguide 108 has one end optically connected to the output end of the Mach-Zehnder interferometer 106 forming a modulation unit and the other end located in the other of both the opposite ends of the substrate 102. The other end of the output-side optical waveguide 108 is an output end from which an output light of the optical modulator 100 according to the present embodiment is output.

The Mach-Zehnder interferometer 106 is formed in a part of the optical waveguide in the optical modulator 100 and forms a modulation unit that modulates a light guided in the optical waveguide. The Mach-Zehnder interferometer 106 has an optical splitter (light splitter) 110, a pair of arm optical waveguides 112 and 114, and an optical coupler (light coupler) 116. The Mach-Zehnder interferometer 106 is a symmetrical Mach-Zehnder interferometer in which the arm optical waveguides 112 and 114 have the same waveguide length as each other and formed symmetrically, for example. Note that the Mach-Zehnder interferometer 106 may be an asymmetrical Mach-Zehnder interferometer in which the arm optical waveguides 112 and 114 have different waveguide lengths from each other.

The optical splitter 110 is of a one-input two-output type, the input port thereof is optically connected to the other end of the input-side optical waveguide 104, and the two output ports thereof are optically connected to one ends of the arm optical waveguides 112 and 114, respectively. The optical splitter 110 divides an input light input to the input port from the input-side optical waveguide 104, for example, equally into the two output ports and outputs the divided lights to the arm optical waveguides 112 and 114, respectively. The optical splitter 110 can be formed of a Y-branch optical waveguide, a multimode interference (MMI) coupler, a directional coupler, or the like, for example.

The optical combiner 116 is of a two-input one-output type, the two input ports thereof are optically connected to the other ends of the arm optical waveguides 112 and 114, respectively, and the output port thereof is optically connected to one end of the output-side optical waveguide 108. The optical combiner 116 combines lights input to the two input ports from the arm optical waveguides 112 and 114, respectively, and outputs the combined light to the output port. The optical combiner 116 can be formed of a Y-branch optical waveguide, an MMI coupler, a directional coupler, or the like, for example.

The arm optical waveguides 112 and 114 have the same waveguide length as each other and are formed to have linear portions parallel to each other, for example. Furthermore, the arm optical waveguides 112 and 114 each have a bending portion curved to be optically connected to the output port of the optical splitter 110 from the linear portion. Further, the arm optical waveguides 112 and 114 each have a bending portion curved to be optically connected to the input port of the optical combiner 116 from the linear portion.

On the linear portions of the arm optical waveguides 112 and 114, high frequency electrodes 118 and 120 are formed which apply high-frequency voltages to the arm optical waveguides 112 and 114, respectively. The high frequency electrodes 118 and 120 each have a thin rectangular planar shape along the linear portion of the arm optical waveguides 112 and 114.

In a region between the linear portions of the arm optical waveguides 112 and 114, a ground electrode 122 having a thin rectangular planar shape along the high frequency electrodes 118 and 120 is formed. Further, in regions outside the linear portions of the arm optical waveguides 112 and 114, ground electrodes 124 and 126 having a thin rectangular planar shape along the high frequency electrodes 118 and 120 are formed, respectively.

Wirings 128 and 130 formed on the substrate 102 are connected to one end and the other end of the high frequency electrode 118, respectively. An electrode pad 132 formed on the substrate 102 is connected to the wiring 128. An electrode pad 133 formed on the substrate 102 is connected to the wiring 130. A high-frequency voltage can be applied to the high frequency electrode 118 via the electrode pads 132 and 133 and the wirings 128 and 130.

Wirings 134 and 136 formed on the substrate 102 are connected to one end and the other end of the high frequency electrode 120, respectively. An electrode pad 138 formed on the substrate 102 is connected to the wiring 134. An electrode pad 139 formed on the substrate 102 is connected to the wiring 136. A high-frequency voltage can be applied to the high frequency electrode 120 via the electrode pads 138 and 139 and the wirings 134 and 136.

FIG. 15B is a sectional view taken along the line D-D of FIG. 15A and illustrates the sectional structure including the arm optical waveguide 112 and the high frequency electrode 118.

As illustrated in FIG. 15B, on the substrate 102 that is an InP substrate, for example, a lower clad layer 144 that is an n-type InP layer, for example, is formed. On the lower clad layer 144, a core layer 146 that is an active layer having the multi-quantum well (MQW) structure comprising AlGaInAs/AlInAs, for example, is formed. On the core layer 146, an upper clad layer 148 that is a p-type InP layer, for example, is formed. On the upper clad layer 148, a contact layer 150 is formed.

The contact layer 150, the upper clad layer 148, the core layer 146, and the upper part of the lower clad layer 144 form the high-mesa structure integrally formed in a mesa shape having a predetermined mesa width. Both ends of this high-mesa structure are covered with an insulating resin 152 such as a polyimide, Benzocyclobutene (BCB), or the like, for example, and a protection film (not shown) comprising a silicon nitride film, for example, in series.

The high frequency electrode 118 is formed on the contact layer 150. Further, ground electrodes 122 and 124 are formed on the lower clad layer 144 on both sides of the mesa structure described above, respectively.

Note that the sectional structure including the arm optical waveguide 114 and the high frequency electrode 120 has the same structure as the sectional structure including the arm optical waveguide 112 and the high frequency electrode 118 described above.

In response to application of high-frequency voltages to the high frequency electrodes 118 and 120, the refractive index of the core layer 146 having the multi-quantum well structure changes due to a quantum-confined stark effect (QCSE). In response, the phase difference of lights propagating in the core layers 146 of the two arm optical waveguides 112 and 114 change, and the interference in the optical combiner 116 of the Mach-Zehnder interferometer 106 changes. In such a configuration, it is possible to switch presence and absence of output of a light from the Mach-Zehnder interferometer 106 or modulate a light intensity of an output light by controlling application of the high-frequency voltage to the high frequency electrodes 118 and 120.

In a manner described above, a high-frequency voltage can be applied to the arm optical waveguide 112 by using the high frequency electrode 118. Application of a voltage to the arm optical waveguide 112 causes a change in the refractive index of the core layer 146 of the arm optical waveguide 112. A change in the refractive index of the core layer 146 of the arm optical waveguide 112 causes a change in the phase of a light propagating in the core layer 146 of the arm optical waveguide 112. In the optical modulator 100 according to the present embodiment, a phase modulation unit 140 having the arm optical waveguide 112 and the high frequency electrode 118 is formed. The phase modulation unit 140 modulates the phase of a light propagating in the core layer 146 of the arm optical waveguide 112 by applying a high-frequency voltage to the arm optical waveguide 112 by using the high frequency electrode 118 to change the refractive index of the core layer 146 of the arm optical waveguide 112.

Further, a high-frequency voltage can be applied to the arm optical waveguide 114 by using the high frequency electrode 120. Application of a voltage to the arm optical waveguide 114 causes a change in the refractive index of the core layer 146 of the arm optical waveguide 114. A change in the refractive index of the core layer 146 of the arm optical waveguide 114 causes a change in the phase of a light propagating in the core layer 146 of the arm optical waveguide 114. In the optical modulator 100 according to the present embodiment, a phase modulation unit 142 having the arm optical waveguide 114 and the high frequency electrode 120 is formed. The phase modulation unit 142 modulates the phase of a light propagating in the core layer 146 of the arm optical waveguide 114 by applying a high-frequency voltage to the arm optical waveguide 114 by using the high frequency electrode 120 to change the refractive index of the core layer 146 of the arm optical waveguide 114.

In the optical modulator 100 according to the present embodiment, an input light input from the input-side optical waveguide 104 is divided into two arm optical waveguides 112 and 114, lights guided in the arm optical waveguides 112 and 114 are combined, and the combined light is output as an output light from the output-side optical waveguide 108.

At this time, the phase of the light propagating the core layer 146 of both or one of the arm optical waveguides 112 and 114 is modulated by both or one of the phase modulation units 140 and 142. In this way, it is possible to realize modulation of an output light by switching presence or absence of the output of the output light or modulating the light intensity of the output light in accordance with a phase difference generated between the lights propagating the core layers 146 of the arm optical waveguides 112 and 114.

The input-side optical waveguide 104, the arm optical waveguides 112 and 114 of the Mach-Zehnder interferometer 106, and the output-side optical waveguide 108 in the optical modulator 100 according to the present embodiment described above have the high-mesa structure, respectively. Furthermore, the optical element 1 according to the first embodiment described above is formed to these optical waveguides as described below. Note that, in the optical element 1 formed to these optical waveguides, the first optical waveguide 10, the second optical waveguide 20, the third optical waveguide 30, the fourth optical waveguide 40, and the fifth optical waveguide 50 are formed in series from the input end side to the output end side of the optical modulator 100.

First, two optical elements 1 according to the first embodiment are formed to the input-side optical waveguide 104. Specifically, one of the optical elements 1 according to the first embodiment is formed in a portion on the input side in the input-side optical waveguide 104 to which an input light is input. Further, the other optical element 1 according to the first embodiment is formed also in a portion on the Mach-Zehnder interferometer 106 side in the input-side optical waveguide 104, that is, in the pre-stage of the Mach-Zehnder interferometer 106.

Further, a single optical element 1 according to the first embodiment is formed to each of the pair of arm optical waveguides 112 and 114 of the Mach-Zehnder interferometer 106. Specifically, one of the optical elements 1 according to the first embodiment is formed in a portion that is on the input side in a pre-stage of the phase modulation unit 140 of the arm optical waveguide 112, which is the post-stage of the bending portion on the optical splitter 110 side. Further, the other optical element 1 according to the first embodiment is formed in a portion that is on the input side in a pre-stage of the phase modulation unit 142 of the arm optical waveguide 114, which is the post-stage of the bending portion on the optical splitter 110 side.

Furthermore, a single optical element 1 according to the first embodiment is formed to the output-side optical waveguide 108. Specifically, the optical element 1 according to the first embodiment is formed in a portion of the output-side optical waveguide 108 on the output side from which an output light is output, that is, in the post-stage of the Mach-Zehnder interferometer 106.

As described above, in the optical modulator 100 according to the present embodiment, the optical elements 1 according to the first embodiment are formed to the input-side optical waveguide 104, the arm optical waveguides 112 and 114, and the output-side optical waveguide 108, respectively. The optical elements 1 according to the first embodiment formed to these optical waveguides function as a higher order mode filter. With such the optical elements 1, a higher order mode included in an input light input to the optical modulator 100 and a higher order mode excited during light being guided in these optical waveguides can be sufficiently reduced or removed.

The input light input to the optical modulator 100 according to the present embodiment may include a higher order mode. The optical elements 1 according to the first embodiment formed in a portion on the input side and a portion on the Mach-Zehnder interferometer 106 side, respectively, in the input-side optical waveguide 104 can sufficiently reduce or remove a higher order mode included in an input light while suppressing the fundamental mode loss to a smaller level. Further, sufficient reduction or removal of a higher order mode by using the optical element 1 according to the first embodiment formed in the pre-stage of the Mach-Zehnder interferometer 106 allows for accurate modulation of a light in the Mach-Zehnder interferometer 106 forming a modulation unit.

Further, in the optical splitter 110 formed of an MMI coupler or the like, a higher order mode of a guided light may be excited. The optical element 1 according to the first embodiment formed in a portion on the input side and in the pre-stage of the phase modulation unit 140 of the arm optical waveguide 112 can sufficiently reduce or remove a higher order mode excited at the optical splitter 110 while suppressing the fundamental mode loss to a smaller level. Also, the optical element 1 according to the first embodiment formed in a portion on the input side in the pre-stage of the phase modulation unit 142 of the arm optical waveguide 114 can sufficiently reduce or remove a higher order mode excited at the optical splitter 110 while suppressing the fundamental mode loss to a smaller level.

Also in the optical combiner 116 formed of an MMI coupler or the like, a higher order mode of a guided light may be excited. The optical element 1 according to the first embodiment formed in a portion on the output side in the output-side optical waveguide 108 can sufficiently reduce or remove a higher order mode excited at the optical combiner 116 while suppressing the fundamental mode loss to a smaller level. Further, the optical element 1 according to the first embodiment formed in a portion on the output side in the output-side optical waveguide 108 can sufficiently reduce or remove a higher order mode excited during a light being guided up to the output-side optical waveguide 108 before the output light is output while suppressing the fundamental mode loss to a smaller level.

Also in the bending portions of the arm optical waveguides 112 and 114, a higher order mode of a guided light may be excited. The optical elements 1 according to the first embodiment formed in a portion on the input side in the pre-stage of the phase modulation units 140 and 142 of the arm optical waveguides 112 and 114 are formed in the post stage of the bending portions on the optical splitter 110 side in the arm optical waveguides 112 and 114, respectively. Further, the optical element 1 according to the first embodiment formed in a portion on the output side of the output-side optical waveguide 108 is formed in the post-stage of the bending portion on the optical splitter 110 side and the optical combiner 116 side in the arm optical waveguides 112 and 114. The above optical elements can sufficiently reduce or remove a higher order mode excited at the bending portions of the arm optical waveguides 112 and 114 while suppressing the fundamental mode loss to a smaller level.

As discussed above, in the optical modulator 100 according to the present embodiment, the optical elements 1 according to the first embodiment are formed to the input-side optical waveguide 104, the arm optical waveguides 112 and 114, and the output-side optical waveguide 108, respectively. These optical elements 1 can sufficiently reduce or remove a higher order mode that may be input to the optical modulator 100 and a higher order mode that may be excited at the optical modulator 100, while suppressing the fundamental mode loss to a smaller level. With such sufficient reduction or removal of a higher order mode, in the optical modulator 100 according to the present embodiment, the output level in an off-state can be sufficiently reduced, which can achieve a high extinction ratio and improve an extinction ratio property.

Note that, in the optical modulator 100 according to the present embodiment, all the plurality of optical elements 1 described above are not necessarily required to be formed, but at least any one of the plurality of optical elements 1 described above may be formed. Further, the optical element 1 may be formed in a portion of an optical waveguide other than those described above.

Further, while the case where the optical element 1 according to the first embodiment is formed in the optical modulator 100 has been described above, the optical element according to the second embodiment may be formed instead of the optical element 1 according to the first embodiment.

Fourth Embodiment

Figure 16:
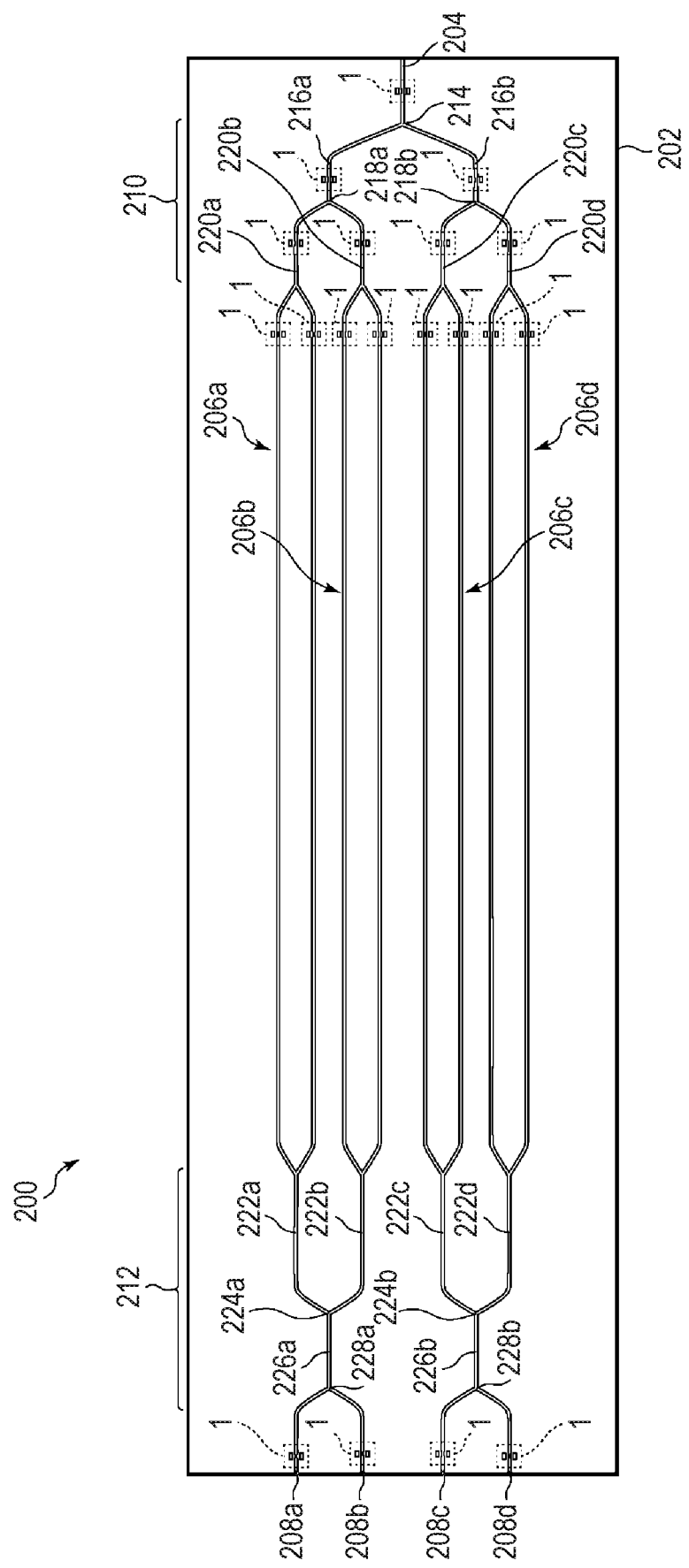
FIG. 16 is a plan view illustrating an optical modulator according to a fourth embodiment of the present invention.

An optical modulator according to a fourth embodiment of the present invention will be described by using FIG. 16. FIG. 16 is a plan view illustrating the optical modulator according to the present embodiment. Note that the same components as those in the optical element and the manufacturing method thereof according to the first and second embodiments described above and the optical modulator according to the third embodiment described above are labeled with the same reference numerals, and the description thereof will be omitted or simplified.

The optical modulator according to the present embodiment is a multistage Mach-Zehnder optical modulator having a plurality of Mach-Zehnder interferometers. The optical modulator according to the present embodiment has a plurality of optical elements 1 according to the first embodiment described above that are formed and inserted in predetermined portions of the optical waveguides thereof.

The configuration of the optical modulator according to the present embodiment will be described below by using FIG. 16.

As illustrated in FIG. 16, the optical modulator 200 according to the present embodiment has an input-side optical waveguide 204, four Mach-Zehnder interferometers 206a, 206b, 206c, and 206d, and four output-side optical waveguides 208a, 208b, 208c, and 208d. The four output-side optical waveguides 208a, 208b, 208c, and 208d are formed for the one input-side optical waveguide 204. The input-side optical waveguide 204 is formed on the input end side in the optical modulator 200. Further, the output-side optical waveguides 208a, 208b, 208c, and 208d are formed on the output end side in the optical modulator 200. Further, the four Mach-Zehnder interferometers 206a, 206b, 206c, and 206d are formed in parallel.

Further, the optical modulator 200 according to the present embodiment has a splitter unit 210 formed of optical splitters and optical waveguides and a combiner splitter unit 212 formed of optical combiners, optical splitters, and optical waveguides. The splitter unit 210 is formed between the input-side optical waveguide 204 and the Mach-Zehnder interferometers 206a, 206b, 206c, and 206d. Further, the combiner splitter unit 212 is formed between the Mach-Zehnder interferometers 206a, 206b, 206c, and 206d and the output-side optical waveguides 208a, 208b, 208c, and 208d.

The input-side optical waveguide 204, the splitter unit 210, the Mach-Zehnder interferometers 206a, 206b, 206c, and 206d, the combiner splitter unit 212, and the output-side optical waveguides 208a, 208b, 208c, and 208d are integrally formed on a substrate 202 that is a semiconductor substrate.

The input-side optical waveguide 204 has one end located at one end of both the opposite ends of the substrate 202 and the other end optically connected to the input end of the splitter unit 210. The one end of the input-side optical waveguide 204 is an input end to which an input light to be input to the optical modulator 200 according to the present embodiment is input. The input light is a light output from a light source such as a not-shown semiconductor laser, for example. Note that a light source such as a semiconductor laser can be integrated in a monolithic manner on the same substrate 202 as that for the optical modulator 200 according to the present embodiment.

The splitter unit 210 has an optical splitter (light splitter) 214, optical waveguides 216a and 216b, optical splitters (light splitter) 218a and 218b, and optical waveguides 220a, 220b, 220c, and 220d.

The optical splitter 214 is of a one-input two-output type, the input port thereof is optically connected to the other end of the input-side optical waveguide 204, and the two output ports thereof are optically connected to one ends of the optical waveguides 216a and 216b, respectively. The optical splitter 214 divides an input light input to the input port from the input-side optical waveguide 214, for example, equally into the two output ports and outputs the divided lights to the optical waveguides 216a and 216b, respectively.

The optical splitter 218a is of a one-input two-output type, the input port thereof is optically connected to the other end of the optical waveguide 216a, and the two output ports thereof are optically connected to one ends of the optical waveguides 220a and 220b, respectively. The optical splitter 218a divides a light input to the input port from the optical waveguide 216a, for example, equally into the two output ports and outputs the divided lights to the optical waveguides 220a and 220b, respectively.

The optical splitter 218b is of a one-input two-output type, the input port thereof is optically connected to the other end of the optical waveguide 216b, and the two output ports thereof are optically connected to one ends of the optical waveguides 220c and 220d, respectively. The optical splitter 218b divides a light input to the input port from the optical waveguide 216b, for example, equally into the two output ports and outputs the divided lights to the optical waveguides 220c and 220d, respectively.

The optical splitters 214, 218a, and 218b described above can be formed of a Y-branch optical waveguide, an MMI coupler, a directional combiner, or the like, for example.

The other ends of the optical waveguides 220a, 220b, 220c, and 220d are optically connected to the input ends of the Mach-Zehnder interferometers 206a, 206b, 206c, and 206d, respectively.

The input-side optical waveguides 204 and the optical waveguides 216a, 216b, 216c, 216d, 220a, 220b, 220c, and 220d in the splitter unit 210 described above have the high-mesa structure, respectively. Furthermore, the optical elements 1 according to the first embodiment described above are formed to these optical waveguides as described below. Note that, in the optical elements 1 formed to these optical waveguides, the first optical waveguide 10, the second optical waveguide 20, the third optical waveguide 30, the fourth optical waveguide 40, and the fifth optical waveguide are formed in series from the input end side to the output end side in the optical modulator 200.

First, a single optical element 1 according to the first embodiment is formed to the input-side optical waveguide 204. The optical element 1 according to the first embodiment formed to the input-side optical waveguide 204 can sufficiently reduce or remove a higher order mode included in an input light input to the input-side optical waveguide 204 while suppressing the fundamental mode loss to a smaller level.

Further, each one optical element 1 according to the first embodiment is formed to the optical waveguides 216a and 216b optically connected to the output port of the optical splitter 214, respectively. The optical waveguides 216a and 216b have a curved bending portion, respectively, and the optical elements 1 according to the first embodiment are formed in the post-stage of the bending portions of the optical waveguides 216a and 216b, respectively.

The optical element 1 according to the first embodiment formed in the post-stage of the bending portion of the optical waveguide 216a can sufficiently reduce or remove a higher order mode excited at the optical splitter 214 and a higher order mode excited at the bending portion of the optical waveguide 216a while suppressing the fundamental mode loss to a smaller level. The optical element 1 according to the first embodiment formed in the post-stage of the bending portion of the optical waveguide 216b can sufficiently reduce or remove a higher order mode excited at the optical splitter 214 and a higher order mode excited at the bending portion of the optical waveguide 216b while suppressing the fundamental mode loss to a smaller level.

Further, each one optical element 1 according to the first embodiment is formed to the optical waveguides 220a and 220b optically connected to the output port of the optical splitter 218a, respectively. Further, each one optical element 1 according to the first embodiment is formed to the optical waveguides 220c and 220d optically connected to the output port of the optical splitter 218b, respectively. The optical waveguides 220a, 220b, 220c, and 220d have a curved bending portion, respectively, and the optical elements 1 according to the first embodiment are formed in the post-stage of the bending portions of the optical waveguides 220a, 220b, 220c, and 220d, respectively.

The optical element 1 according to the first embodiment formed in the post-stage of the bending portion of the optical waveguide 220a can sufficiently reduce or remove a higher order mode excited at the optical splitter 218a and a higher order mode excited at the bending portion of the optical waveguide 220a while suppressing the fundamental mode loss to a smaller level. The optical element 1 according to the first embodiment formed in the post-stage of the bending portion of the optical waveguide 220b can sufficiently reduce or remove a higher order mode excited at the optical splitter 218a and a higher order mode excited at the bending portion of the optical waveguide 220b while suppressing the fundamental mode loss to a smaller level.

The optical element 1 according to the first embodiment formed in the post-stage of the bending portion of the optical waveguide 220c can sufficiently reduce or remove a higher order mode excited at the optical splitter 218b and a higher order mode excited at the bending portion of the optical waveguide 220c while suppressing the fundamental mode loss to a smaller level. The optical element 1 according to the first embodiment formed in the post-stage of the bending portion of the optical waveguide 220d can sufficiently reduce or remove a higher order mode excited at the optical splitter 218b and a higher order mode excited at the bending portion of the optical waveguide 220d while suppressing the fundamental mode loss to a smaller level.

The Mach-Zehnder interferometers 206a, 206b, 206c, and 206d formed in parallel on the substrate 202 have the same configuration as that of the Mach-Zehnder interferometer 106 in the third embodiment, respectively. Note that, while electrodes and wirings are omitted in FIG. 16, high frequency electrodes, ground electrodes, wirings, and electrode pads are formed to the Mach-Zehnder interferometers 206a, 206b, 206c, and 206d in the same manner as the Mach-Zehnder interferometers 106, respectively.

Each one optical element 1 according to the first embodiment is formed to the arm optical waveguides of the Mach-Zehnder interferometers 206a, 206b, 206c, and 206d, respectively. Specifically, in each of the Mach-Zehnder interferometers 206a, 206b, 206c, and 206d, the optical element 1 according to the first embodiment is formed in a portion in a portion that is on input side on the pre-stage of the phase modulation unit of a pair of arm optical waveguides, which is the post-stage of the bending portion on the optical splitter side.

Also in each of the Mach-Zehnder interferometers 206a, 206b, 206c, and 206d, the optical element 1 according to the first embodiment formed to the arm optical waveguide can sufficiently reduce or remove a higher order mode while suppressing the fundamental mode loss to a smaller level in the same manner as the third embodiment. A higher order mode sufficiently reduced or removed in this case is a higher order mode excited at the optical splitter and a higher order mode excited at the bending portion of the arm waveguide.

The combiner splitter unit 212 has optical waveguides 222a, 222b, 222c, and 222d, optical combiners (optical coupler) 224a and 224b, optical waveguides 226a and 226b, and optical splitters (light splitter) 228a and 228b.

One ends of the optical waveguides 222a, 222b, 222c, and 222d are optically connected to the output ends of the Mach-Zehnder interferometers 206a, 206b, 206c, and 206d, respectively.

The optical combiner 224a is of a two-input one-output type, the two input ports thereof are optically connected to the other ends of the optical waveguides 222a and 222b, respectively, and the output port thereof is optically connected to one end of the optical waveguide 226a. The optical combiner 224a combines lights input to the two input ports from the optical waveguides 222a and 222b, respectively, and outputs the combined light to the output port.

The optical combiner 224b is of a two-input one-output type, the two input ports thereof are optically connected to the other ends of the optical waveguides 222c and 222d, respectively, and the output port thereof is optically connected to one end of the optical waveguide 226b. The optical combiner 224b combines lights input to the two input ports from the optical waveguides 222c and 222d, respectively, and outputs the combined light to the output port.

The optical combiners 224a and 224b can be each formed of a Y-branch optical waveguide, an MMI coupler, a directional coupler, or the like, for example.

The optical splitter 228a is of a one-input two-output type, the input port thereof is optically connected to the other end of the optical waveguide 226a, and the two output ports thereof are optically connected to one ends of the output-side optical waveguides 208a and 208b, respectively. The optical splitter 228a divides a light input to the input port from the optical waveguide 226a, for example, equally into the two output ports and outputs the divided lights to the output-side optical waveguides 208a and 208b, respectively.

The optical splitter 228b is of a one-input two-output type, the input port thereof is optically connected to the other end of the optical waveguide 226b, and the two output ports thereof are optically connected to one ends of the output-side optical waveguides 208c and 208d, respectively. The optical splitter 228b divides a light input to the input port from the optical waveguide 226b, for example, equally into the two output ports and outputs the divided lights to the output-side optical waveguides 208c and 208d, respectively.

The optical splitters 228a and 228b can be each formed of a Y-branch optical waveguide, an MMI coupler, a directional coupler, or the like, for example.

The output-side optical waveguides 208a, 208b, 208c, and 208d each have the other end located at the other end of both the opposite ends of the substrate 202. The other ends of the output-side optical waveguides 208a, 208b, 208c, and 208d each are an output end from which an output light of the optical modulator 200 according to the present embodiment is output. Note that the output light output from one of the output-side optical waveguides 208a and 208b can be used as a monitor light for monitoring the operation. Also, the output light output from one of the output-side optical waveguides 208c and 208d can be used as a monitor light for monitoring the operation.

The optical waveguides 222a, 222b, 222c, 222d, 226a, and 226b in the combiner splitter unit 212 and the output-side optical waveguides 208a, 208b, 208c, and 208d have the high-mesa structure, respectively. Furthermore, the optical elements 1 according to the first embodiment described above are formed to the output-side optical waveguides 208a, 208b, 208c, and 208d as described below. Note that, in the optical element 1 formed to the output-side optical waveguide 208a, the first optical waveguide 10, the second optical waveguide 20, the third optical waveguide 30, the fourth optical waveguide 40, and the fifth optical waveguide are formed in series from the input end side to the output end side of the optical modulator 200. Also in the optical elements formed to the output-side optical waveguides 208b, 208c, and 208d, the first optical waveguide 10, the second optical waveguide 20, the third optical waveguide 30, the fourth optical waveguide 40, and the fifth optical waveguide 50 are formed in series in the same order.

The single optical element 1 according to the first embodiment is formed to the output-side optical waveguides 208a, 208b, 208c, and 208d, respectively. The output-side optical waveguides 208a, 208b, 208c, and 208d have a curved bending portion, respectively, and the optical elements 1 according to the first embodiment are formed in the post-stage of the bending portions of the output-side optical waveguides 208a, 208b, 208c, and 208d, respectively.

The optical element 1 according to the first embodiment formed in the post-stage of the bending portion of the output-side optical waveguide 208a can sufficiently reduce or remove a higher order mode excited at the optical combiner 224a and the optical splitter 228a while suppressing the fundamental mode loss to a smaller level. Further, this optical element 1 can sufficiently reduce or remove a higher order mode excited at the bending portion of the output-side optical waveguide 208a while suppressing the fundamental mode loss to a smaller level. Furthermore, this optical element 1 can sufficiently reduce or remove a higher order mode excited during a light being guided up to the output-side optical waveguide 208a before the output light is output while suppressing the fundamental mode loss to a smaller level.

The optical element 1 according to the first embodiment formed in the post-stage of the bending portion of the output-side optical waveguide 208b can sufficiently reduce or remove a higher order mode excited at the optical combiner 224a and the optical splitter 228a while suppressing the fundamental mode loss to a smaller level. Further, this optical element 1 can sufficiently reduce or remove a higher order mode excited at the bending portion of the output-side optical waveguide 208b while suppressing the fundamental mode loss to a smaller level. Furthermore, this optical element 1 can sufficiently reduce or remove a higher order mode excited during a light being guided up to the output-side optical waveguide 208b before the output light is output while suppressing the fundamental mode loss to a smaller level.

The optical element 1 according to the first embodiment formed in the post-stage of the bending portion of the output-side optical waveguide 208c can sufficiently reduce or remove a higher order mode excited at the optical combiner 224b and the optical splitter 228b while suppressing the fundamental mode loss to a smaller level. Further, this optical element 1 can sufficiently reduce or remove a higher order mode excited at the bending portion of the output-side optical waveguide 208c while suppressing the fundamental mode loss to a smaller level. Furthermore, this optical element 1 can sufficiently reduce or remove a higher order mode excited during a light being guided up to the output-side optical waveguide 208c before the output light is output while suppressing the fundamental mode loss to a smaller level.

The optical element 1 according to the first embodiment formed in the post-stage of the bending portion of the output-side optical waveguide 208d can sufficiently reduce or remove a higher order mode excited at the optical combiner 224b and the optical splitter 228b while suppressing the fundamental mode loss to a smaller level. Further, this optical element 1 can sufficiently reduce or remove a higher order mode excited at the bending portion of the output-side optical waveguide 208d while suppressing the fundamental mode loss to a smaller level. Furthermore, this optical element 1 can sufficiently reduce or remove a higher order mode excited during a light being guided up to the output-side optical waveguide 208d before the output light is output while suppressing the fundamental mode loss to a smaller level.

In the optical modulator 200 according to the present embodiment, the phase of a light guided in the arm optical waveguide is modulated by the phase modulation unit of the Mach-Zehnder interferometers 206a, 206b, 206c, and 206d. It is thus possible to realize modulation of an output light by switching presence or absence of the output of the output lights output from a set of the output-side optical waveguides 208a and 208b and a set of the output-side optical waveguides 208c and 208d or modulating the light intensity of the output lights thereof.

As described above, also in the optical modulator 200 according to the present embodiment having a plurality of Mach-Zehnder interferometers 206a, 206b, 206c, and 206d, a plurality of optical elements 1 according to the first embodiment can be formed as described above. It is therefore possible to sufficiently reduce or remove a higher order mode while suppressing the fundamental mode loss to a smaller level.

Note that, in the optical modulator 200 according to the present embodiment, all the plurality of optical elements 1 described above are not necessarily required to be formed, but at least any one of the plurality of optical elements 1 described above may be formed. Further, the optical element 1 may be formed in a portion of an optical waveguide other than those described above.

Further, while the case where the optical element 1 according to the first embodiment is formed in the optical modulator 200 has been described above, the optical element according to the second embodiment may be formed instead of the optical element 1 according to the first embodiment.

Modified Embodiments

The present invention is not limited to the embodiments described above, and various modifications are possible.

For example, while the case where an InP-based compound semiconductor material is used to form the optical element has been described as an example in the embodiments described above, the material forming the optical element is not limited thereto. The same advantageous effects as those of the optical elements of the embodiments described above can be obtained also by using a GaAs-based compound semiconductor material, an Si-based semiconductor material, a dielectric material, a polymer material, or the like to form the optical element, for example.

Further, while the case where the optical element 1 has the first to fifth optical waveguides 10, 20, 30, 40, and 50 has been described as an example in the embodiments described above, the optical element 1 may have optical waveguides of at least the first to third optical waveguides 10, 20, and 30. Also in this case, the optical element 1 can function as a higher order mode filter.

Further, the structure, the composition material, the manufacturing condition, and the like of the optical element described in the embodiments described above have been illustrated as a mere example, and modification or change thereto is possible as appropriate in accordance with technical common knowledge or the like of those skilled in the art.

LIST OF REFERENCE NUMERALS

1: optical element
10: first optical waveguide
20: second optical waveguide
30: third optical waveguide
40: fourth optical waveguide
50: fifth optical waveguide
60: substrate
62: lower clad layer
64: core layer
66: upper clad layer
80: hard mask
81: first mask part
82: second mask part
100: optical modulator
102: substrate
104: input-side optical waveguide
106: Mach-Zehder interferometer
108: output-side optical waveguide
110: optical splitter
112, 114: arm optical waveguide
116: optical combiner
140, 142: phase modulation unit
200: optical modulator
206a, 206b, 206c, 206d: Mach-Zehder interferometer

The invention claimed is:

1. An optical element comprising:
a substrate; and
a first optical waveguide, a second optical waveguide, a third optical waveguide, a fourth optical waveguide, and a fifth optical waveguide formed on the substrate and each having a lower clad layer, a core layer, and an upper clad layer, wherein the core layer has a larger refractive index than the lower clad layer and the upper clad layer, the core layers of the first optical waveguide, the second optical waveguide, the third optical waveguide, the fourth optical waveguide, and the fifth optical waveguide each having a same thickness that is constant over the first to fifth optical waveguides and being positioned at a same distance from the substrate, wherein the first optical waveguide is optically connected to the second optical waveguide, the second optical waveguide is optically connected to the third optical waveguide, the third optical waveguide is optically connected to the fourth optical waveguide, and the fourth optical waveguide is optically connected to the fifth optical waveguide, wherein the first to fifth optical waveguides have a mesa structure formed in a mesa shape in which at least the upper clad layer and an upper part of the core layer project above the lower clad layer, at least the upper clad layer and the upper part of the core layer being planar in shape and forming a planar interface between the upper clad layer and the core layer, wherein, when a core height is defined as a height, to a bottom face of the core layer, from a top face of the lower clad layer on both sides of the mesa structure or a position where a slope of a side face of the mesa structure is discontinuous toward the top face of the lower clad layer, the core height of the third optical waveguide is lower than the core height of the first optical waveguide and the fifth optical waveguide, and wherein, when a mesa width is defined as a width of a center of the core layer, the mesa width of the third optical waveguide is narrower than the mesa width of the first optical waveguide and the fifth optical waveguide.

2. The optical element according to claim 1, wherein the first to fifth optical waveguides have a mesa structure formed in the mesa shape in which the upper clad layer, the core layer, and the lower clad layer project above the lower clad layer across the first to fifth optical waveguides.

3. The optical element according to claim 2, wherein an under-core depth that is a difference between the core height and a thickness of the core layer of the third optical waveguide is less than or equal to 0.3 µm.

4. The optical element according to claim 1,
wherein an equivalent refractive index of a fundamental mode of the third optical waveguide is larger than a refractive index of the lower clad layer, and
wherein an equivalent refractive index of a higher order mode of the third optical waveguide is smaller than a refractive index of the substrate.

5. The optical element according to claim 1, wherein a thickness of the core layer is greater than or equal to 0.2 µm.

6. An optical modulator comprising:
an optical waveguide;
a modulation unit that is formed in a part of the optical waveguide and modulates a phase of a light guided in the optical waveguide; and
the optical element according to claim 1 formed to the optical waveguide.

7. A manufacturing method of an optical element including a first optical waveguide, a second optical waveguide, a third optical waveguide, a fourth optical waveguide, and a fifth optical waveguide having a lower clad layer, a core layer, and an upper clad layer in which the core layer has a larger refractive index than the lower clad layer and the upper clad layer, the core layers of the first optical waveguide, the second optical waveguide, the third optical waveguide, the fourth optical waveguide, and the fifth optical waveguide each having a same thickness that is constant over the first to fifth optical waveguides and being positioned at a same distance from the substrate, wherein the first optical waveguide is optically connected to the second optical waveguide, the second optical waveguide is optically connected to the third optical waveguide, the third optical waveguide is optically connected to the fourth optical waveguide, and the fourth optical waveguide is optically connected to the fifth optical waveguide, the manufacturing method comprising steps of:
stacking the lower clad layer, the core layer, and the upper clad layer on a substrate;
forming a hard mask on the upper clad layer; and
dry-etching at least the upper clad layer and an upper part of the core layer by using the hard mask as a mask,
wherein the hard mask has a first mask part and second mask parts,
wherein the first mask part has a waveguide pattern of the first optical waveguide, a waveguide pattern of the second optical waveguide, a waveguide pattern of the third optical waveguide, a waveguide pattern of the fourth optical waveguide, and a waveguide pattern of the fifth optical waveguide, and a width of the waveguide pattern of the third optical waveguide is narrower than a width of the waveguide pattern of the first optical waveguide, and a width of the waveguide pattern of the fifth optical waveguide,
wherein the second mask parts are selectively formed in regions on both sides of the waveguide pattern of the third optical waveguide out of regions on both sides of the waveguide patterns of the first to fifth optical waveguides of the first mask part,
wherein the hard mask reduces the dry-etching of a mesa structure of the third optical waveguide relative to the dry-etching of a mesa structure of the first optical waveguide and the fifth optical waveguide, such that the first to fifth optical waveguides have a mesa structure formed in a mesa shape in which at least the upper clad layer and an upper part of the core layer project above the lower clad layer, at least the upper clad layer and the upper part of the core layer being planar in shape and forming a planar interface between the upper clad layer and the core layer,
wherein, when a core height is defined as a height to a bottom face of the core layer from a top face of the lower clad layer on both sides of the mesa structure or a position where a slope of a side face of the mesa structure is discontinuous toward the top face of the lower clad layer, the core height of the third optical waveguide is lower than the core height of the first optical waveguide and the fifth optical waveguide, and
wherein, when a mesa width is defined as a width of a center of the core layer, the mesa width of the third optical waveguide is narrower than the mesa width of the first optical waveguide and the fifth optical waveguide.

8. The manufacturing method of the optical element according to claim 7, wherein a distance between the waveguide pattern of the third optical waveguide in the first mask part and each of the second mask parts is less than or equal to 10 µm.

9. A manufacturing method of an optical element including a first optical waveguide, a second optical waveguide, a third optical waveguide, a fourth optical waveguide, and a fifth optical waveguide having a lower clad layer, a core layer, and an upper clad layer in which the core layer has a larger refractive index than the lower clad layer and the upper clad layer, the core layers of the first optical waveguide, the second optical waveguide, the third optical waveguide, the fourth optical waveguide, and the fifth optical waveguide each having a same thickness that is constant over the first to fifth optical waveguides and being positioned at a same distance from the substrate, wherein the first optical waveguide is optically connected to the second optical waveguide, the second optical waveguide is optically connected to the third optical waveguide, the third optical waveguide is optically connected to the fourth optical waveguide, and the fourth optical waveguide is optically connected to the fifth optical waveguide, the manufacturing method comprising steps of:

stacking the lower clad layer, the core layer, and the upper clad layer on a substrate;

forming a hard mask on the upper clad layer; and dry-etching at least the upper clad layer and an upper part of the core layer by using the hard mask as a mask, wherein the hard mask has a first mask part and second mask parts, wherein the first mask part has a waveguide pattern of the first optical waveguide, a waveguide pattern of the second optical waveguide, a waveguide pattern of the third optical waveguide, a waveguide pattern of the fourth optical waveguide, and a waveguide pattern of the fifth optical waveguide, and a width of the waveguide pattern of the third optical waveguide is narrower than a width of the waveguide pattern of the first optical waveguide and a width of the waveguide pattern of the fifth optical waveguide, wherein the second mask parts are formed in regions on both sides on the waveguide patterns of the first to fifth optical waveguides in the first mask part, wherein, in regions each spaced apart from the first mask part by a constant distance, the second mask parts have portions selectively formed in regions on both sides of the waveguide patterns of the third optical waveguide, wherein a spacing between each of the second mask parts and the waveguide pattern of the third optical waveguide in the first mask part is narrower than a spacing between each of the second mask parts and the waveguide pattern of the first optical waveguide and the fifth optical waveguide in the first mask part and a spacing between each of the second mask parts and the waveguide pattern of the second optical waveguide and the fourth optical waveguide in the first mask part, wherein the hard mask reduces the dry-etching of a mesa structure of the third optical waveguide relative to the dry-etching of a mesa structure of the first optical waveguide and the fifth optical waveguide, such that the first to fifth optical waveguides have a mesa structure formed in a mesa shape in which at least the upper clad layer and an upper part of the core layer project above the lower clad layer, at least the upper clad layer and the upper part of the core layer being planar in shape and forming a planar interface between the upper clad layer and the core layer, wherein, when a core height is defined as a height to a bottom face of the core layer from a top face of the lower clad layer on both sides of the mesa structure or a position where a slope of a side face of the mesa structure is discontinuous toward the top face of the lower clad layer, the core height of the third optical waveguide is lower than the core height of the first optical waveguide and the fifth optical waveguide, and wherein, when a mesa width is defined as a width of a center of the core layer, the mesa width of the third optical waveguide is narrower than the mesa width of the first optical waveguide and the fifth optical waveguide.

10. The manufacturing method of the optical element according to claim 9, wherein a distance between the waveguide pattern of the third optical waveguide in the first mask part and each of the second mask parts is less than or equal to 10 μm.

\* \* \* \* \*